US012489384B2

(12) United States Patent
Shinotsuka et al.

(10) Patent No.: US 12,489,384 B2
(45) Date of Patent: Dec. 2, 2025

(54) CONTROL DEVICE, VEHICLE BEHAVIOR CONTROL DEVICE, AND FORCE GENERATION MECHANISM SYSTEM

(71) Applicant: HITACHI ASTEMO, LTD., Ibaraki (JP)

(72) Inventors: Yuki Shinotsuka, Ibaraki (JP); Yasuaki Aoyama, Tokyo (JP); Ryosuke Hoshi, Tokyo (JP)

(73) Assignee: Astemo, Ltd., Ibaraki (JP)

( * ) Notice: Subject to any disclaimer, the term of this patent is extended or adjusted under 35 U.S.C. 154(b) by 0 days.

(21) Appl. No.: 18/844,847

(22) PCT Filed: Dec. 9, 2022

(86) PCT No.: PCT/JP2022/045454
§ 371 (c)(1),
(2) Date: Mar. 5, 2025

(87) PCT Pub. No.: WO2023/181521
PCT Pub. Date: Sep. 28, 2023

(65) Prior Publication Data
US 2025/0202399 A1    Jun. 19, 2025

(30) Foreign Application Priority Data

Mar. 21, 2022 (JP) ................................. 2022-044786

(51) Int. Cl.
*H02P 23/14* (2006.01)
*B60G 17/015* (2006.01)

(52) U.S. Cl.
CPC ............ *H02P 23/14* (2013.01); *B60G 17/015* (2013.01); *B60G 2400/25* (2013.01)

(58) Field of Classification Search
CPC .............. B60G 17/015; B60G 17/0157; B60G 2400/25; H02P 23/14; H02P 25/064; H02P 6/006; H02P 25/032; B60Y 2400/86
(Continued)

(56) References Cited

U.S. PATENT DOCUMENTS 6,013,994 A * 1/2000 Endo .................... B62D 5/0463
                                                318/434
6,982,502 B1 * 1/2006 Sendaula ................ H02K 16/00
                                                310/12.32
(Continued)

FOREIGN PATENT DOCUMENTS

JP    H10-109655 A    4/1998
JP    2007-166861 A   6/2007
(Continued)

OTHER PUBLICATIONS

International Search Report issued on Jan. 17, 2023 for WO 2023/181521 A1 (4 pages).

*Primary Examiner* — Paul N Dickson
*Assistant Examiner* — Caitlin Anne Miller
(74) *Attorney, Agent, or Firm* — Venjuris, P.C.

(57) ABSTRACT

A control device controls a generation force of a force generating mechanism including a permanent magnet and an armature that generate an adjustable force between a first member and a second member. The control device includes: a command value acquisition unit that acquires a generation force command value of the force generating mechanism; a relative displacement acquisition unit that acquires a relative displacement of the permanent magnet and the armature; a movement direction command acquisition unit that acquires a movement direction command of the armature with respect to the permanent magnet from the generation force command value; and an actual movement direction acquisition (Continued)

unit that acquires an actual movement direction of the armature with respect to the permanent magnet from the relative displacement. The generation force command value is corrected by acquiring a correction value based on the movement direction command and the actual movement direction.

6 Claims, 12 Drawing Sheets

(58) Field of Classification Search
USPC .......................................... 701/37; 280/5.515
See application file for complete search history.

(56) References Cited

U.S. PATENT DOCUMENTS

| | | | |
|---|---|---|---|
| 7,474,067 B2* | 1/2009 | Ueda .................... | B62D 5/0472 |
| | | | 318/434 |
| 8,447,468 B2* | 5/2013 | Uenuma .............. | B60G 17/005 |
| | | | 703/2 |
| 11,351,831 B2* | 6/2022 | Ohno .................... | B60G 15/04 |
| 2006/0181158 A1* | 8/2006 | Tajima .................. | H02K 41/03 |
| | | | 310/12.25 |

FOREIGN PATENT DOCUMENTS

| | | | |
|---|---|---|---|
| JP | 2010-126044 A | 6/2010 | |
| JP | 2010-132150 A | 6/2010 | |
| JP | 2010143397 A * | 7/2010 | ........... B60G 17/016 |
| WO | 2005/035333 A1 | 4/2005 | |

* cited by examiner

CONTROL DEVICE, VEHICLE BEHAVIOR CONTROL DEVICE, AND FORCE GENERATION MECHANISM SYSTEM

TECHNICAL FIELD

The present disclosure relates to a control device, a vehicle behavior control device, and a force generating mechanism system for controlling a force generating mechanism including, for example, a permanent magnet and an armature.

BACKGROUND

Patent Document 1, for example, describes a suspension control device that acquires a stroke position by a stroke sensor and corrects a command value based on an estimated disturbance from a relationship between the stroke position previously acquired and a cogging force of an electromagnetic shock absorber.

PRIOR ART DOCUMENT

Patent Document

Patent Document 1: Japanese Patent Laid-Open Publication No. 2010-126044

SUMMARY OF THE INVENTION

Problems to be Solved

In a force generating mechanism (e.g., an electromagnetic actuator) including a permanent magnet and an armature, pulsations (a thrust pulsation and a torque pulsation) are generated accompanied by a cogging force (cogging torque) generated according to a position (a stroke position and a rotation position) of a mover and an iron loss generated by a speed (a stroke speed and a rotation speed) of the mover. Due to the pulsations, there is a possibility that a thrust or torque output from the force generating mechanism deviates from a desired value (a command value and a target value).

An object of embodiments of the present disclosure is to provide a control device capable of suppressing a pulsation of a force generating mechanism, a vehicle behavior control device, and a force generating mechanism system.

Means to Solve the Problems

An embodiment of the present disclosure provides a control device for controlling a generation force of a force generating mechanism including a permanent magnet and an armature that generate an adjustable force between a first member and a second member. The control device includes a command value acquisition means that acquires a generation force command value of the force generating mechanism by detecting or estimating a state where the first member behaves; a relative displacement acquisition means that acquires a relative displacement of the permanent magnet and the armature; a movement direction command acquisition means that acquires a movement direction command of the armature with respect to the permanent magnet from the generation force command value; and an actual movement direction acquisition means that acquires an actual movement direction of the armature with respect to the permanent magnet from the relative displacement, in which the generation force command value is corrected by acquiring a correction value based on the movement direction command and the actual movement direction.

In addition, an embodiment of the present disclosure provides a vehicle behavior control device for controlling a generation force of a force generating mechanism installed between a vehicle body and a wheel of a vehicle and including a permanent magnet and an armature that generate an adjustable force between the vehicle body and the wheel. The vehicle behavior control device includes a command value acquisition means that acquires a generation force command value of the force generating mechanism by detecting or estimating a state where the vehicle behaves; a relative displacement acquisition means that acquires a relative displacement of the permanent magnet and the armature; a movement direction command acquisition means that acquires a movement direction command of the armature with respect to the permanent magnet from the generation force command value; and an actual movement direction acquisition means that acquires an actual movement direction of the armature with respect to the permanent magnet from the relative displacement, in which the generation force command value is corrected by acquiring a correction value based on the movement direction command and the actual movement direction.

In addition, an embodiment of the present disclosure provides a force generating mechanism system comprising: a force generating mechanism installed between a vehicle body and a wheel of a vehicle and including a permanent magnet and an armature that generate an adjustable force between the vehicle body and the wheel; and a control device configured to control a generation force of the force generating mechanism, wherein the control device includes a command value acquisition means that acquires a generation force command value of the force generating mechanism by detecting or estimating a state where the vehicle behaves; a relative displacement acquisition means that acquires a relative displacement of the permanent magnet and the armature; a movement direction command acquisition means that acquires a movement direction command of the armature with respect to the permanent magnet from the generation force command value; and an actual movement direction acquisition means that acquires an actual movement direction of the armature with respect to the permanent magnet from the relative displacement, in which the generation force command value is corrected by acquiring a current operating state from four operating modes based on the movement direction command and the actual movement direction.

Effect of the Invention

According to an embodiment of the present disclosure, it is possible to suppress a pulsation of a force generating mechanism.

DETAILED DESCRIPTION TO EXECUTE THE INVENTION

Hereinafter, a case where a control device, a vehicle behavior control device, and a force generating mechanism system according to an embodiment of the present disclosure are installed in an automobile as a vehicle (e.g., a four-wheeled automobile) will be described by way of example with reference to the accompanied drawings.

Figure 1:
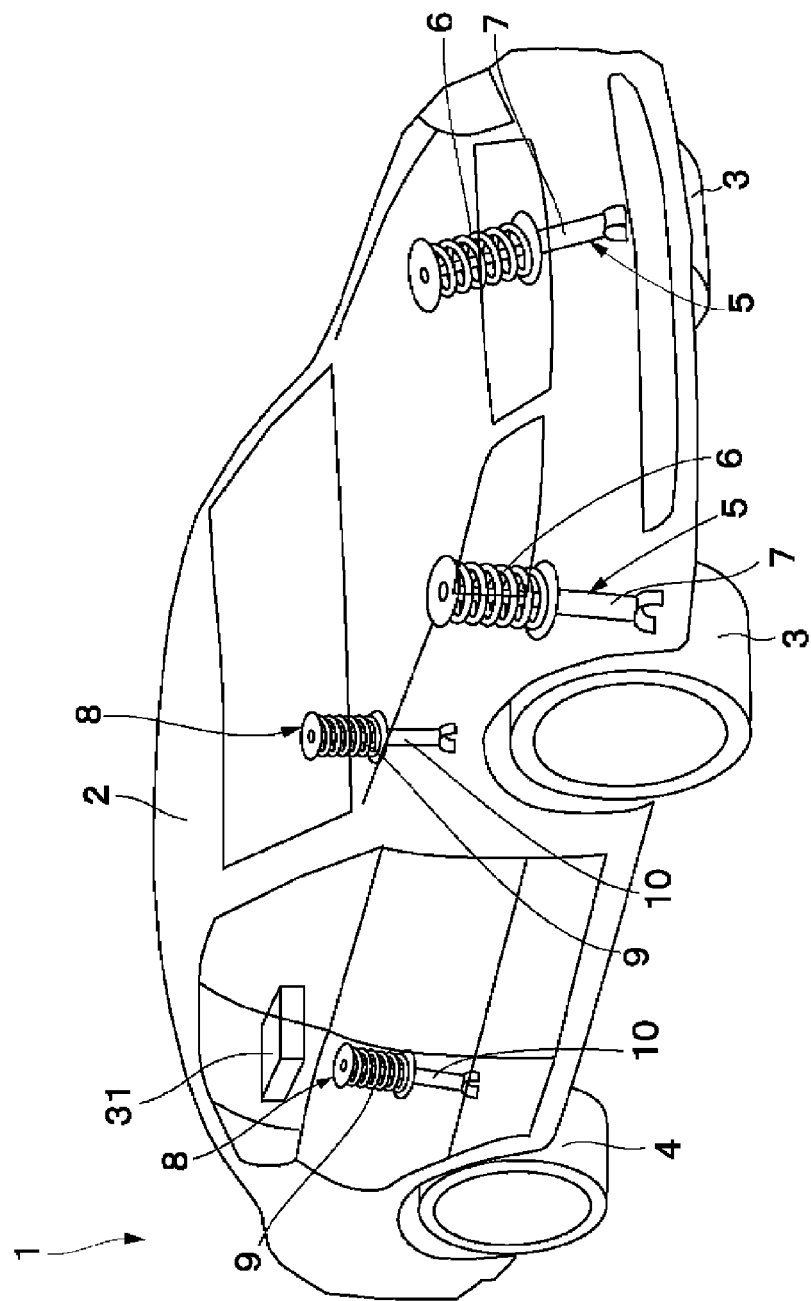
FIG. 1 is an overall configuration view illustrating a four-wheeled vehicle including a control device (vehicle behavior control device) and a force generating mechanism system (electromagnetic actuator system) according to an embodiment of the present disclosure.

In FIG. 1, on a lower side of a vehicle body 2 constituting a body of a vehicle 1 which is an automobile, four wheels 3 and 4 in total, for example, left and right front wheels 3 and left and right rear wheels 4 (only one sides of the wheels are illustrated) are provided. Suspensions 5 (hereinafter, referred to as front wheel suspensions 5) on sides of the front wheels are interposed and mounted between the left and right front wheels 3 and the vehicle body 2. The front wheel suspension 5 includes a suspension spring 6 (hereinafter, referred to as a spring 6) and an electromagnetic actuator 7 that serves as a shock absorber (damper) installed in parallel with the suspension spring 6.

Figure 2:
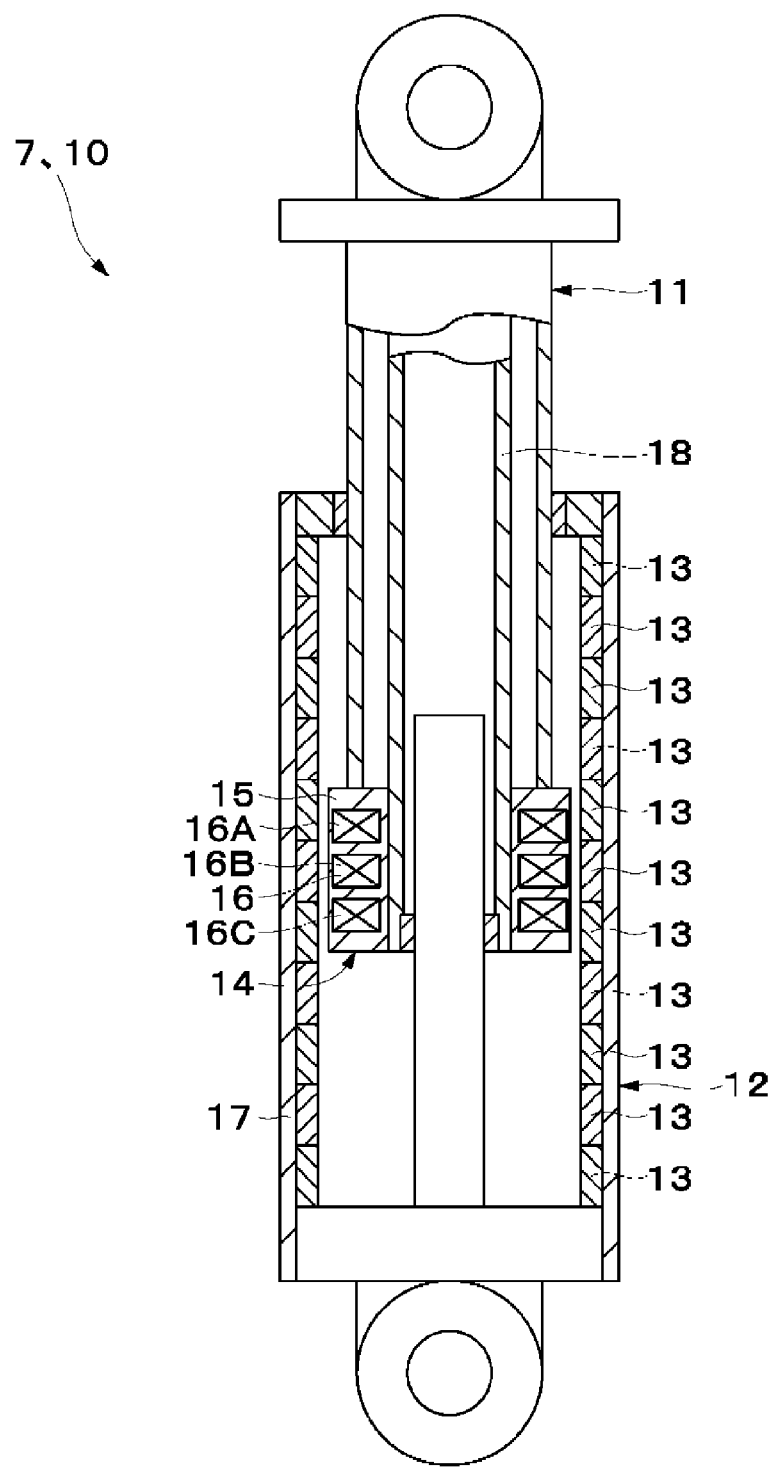
FIG. 2 is a longitudinal cross-sectional view illustrating a force generating mechanism (electromagnetic actuator).

Between the left and right rear wheels 4 and the vehicle body 2, suspensions 8 (hereinafter, referred to as rear wheel suspensions 8) are interposed and mounted, respectively. The rear wheel suspension 8 includes a suspension spring 9 (hereinafter, referred to as a spring 9) and an electromagnetic actuator 10 that serves as a shock absorber (damper) installed in parallel with the spring 9. As illustrated in FIG. 2 as described below, each of the electromagnetic actuators 7 and 10 is configured to include a linear motor including permanent magnets 13 and an armature 14, and is also called an electronic linear motor or an electronic linear actuator.

As illustrated in FIG. 1, the electromagnetic actuators 7 and 10 are provided between the vehicle body 2 and the wheels 3 and 4 of the vehicle 1 (more specifically, members on wheel sides, which support the wheels 3 and 4). The electromagnetic actuators 7 and 10 include the permanent magnets 13 and the armature 14. The electromagnetic actuators 7 and 10 correspond to force generating mechanisms (actuators) that generate an adjustable force between the vehicle body 2 and the wheels 3 and 4. The electromagnetic actuators 7 and 10 constitute an active suspension system of the vehicle 1. The electromagnetic actuators 7 and 10 correspond to a vehicle body posture control device (vehicle body posture control system) that controls the posture of the vehicle 1. The vehicle body 2, which is a member on an upper side of the springs (spring upper member) of the vehicle 1, corresponds to a first member, and the wheels 3 and 4, which are members on a lower side of the springs (spring lower members) of the vehicle 1, correspond to a second member. Alternatively, the vehicle body 2 may be the second member, and the wheels 3 and 4 may be the first member.

As illustrated in FIG. 2, the electromagnetic actuators 7 and 10 include, for example, a stator 11 disposed on the upper side of the spring, and a mover 12 disposed on the lower side of the spring. The electromagnetic actuators 7 and 10 constitute a three-phase linear motor (three-phase linear synchronous motor) by, for example, the permanent magnets 13 installed on the mover 12, and the armature 14 (core 15 and coils 16) installed on the stator 11. More specifically, the electromagnetic actuators 7 and 10 are configured as cylindrical linear electromagnetic actuators formed of a pair of coaxial cylindrical members capable of relative displacement, and are interposed between the vehicle body 2 and the wheels 3 and 4, which move relative to each other.

In this case, the electromagnetic actuators 7 and 10 include, for example, a plurality of permanent magnets 13 as magnetic members (magnets) installed on an outer tube 17, and a plurality (multiple phases) of coils 16 (i.e., a U-phase coil 16A, a V-phase coil 16B, and a W-phase coil 16C) installed on the inner tube 18 through the core 15. The coils 16 (16A, 16B, and 16C) are disposed to face the permanent magnets 13 in a radial direction over the entire circumference.

The stator 11 on which the armature 14 is installed and the mover 12 on which the permanent magnets 13 are installed, are disposed to be capable of linear relative displacement (relative movement) between the spring upper member and the spring lower member. The electromagnetic actuators 7 and 10 extend and compress according to the relative displacement of the stator 11 and the mover 12. In other words, the mover 12, which is a rod or cylinder of the electromagnetic actuators 7 and 10, extends and compresses with respect to the stator 11, which is a cylinder or rod of the electromagnetic actuators 7 and 10. The stator 11 and the mover 12 generate thrust in an axial direction, which is a stroke direction, that is, in a vertical direction of FIG. 2, which is a direction of the relative displacement. Thus, the electromagnetic actuators 7 and 10 generate a force between the vehicle body 2 and the wheels 3 and 4.

Figure 3:
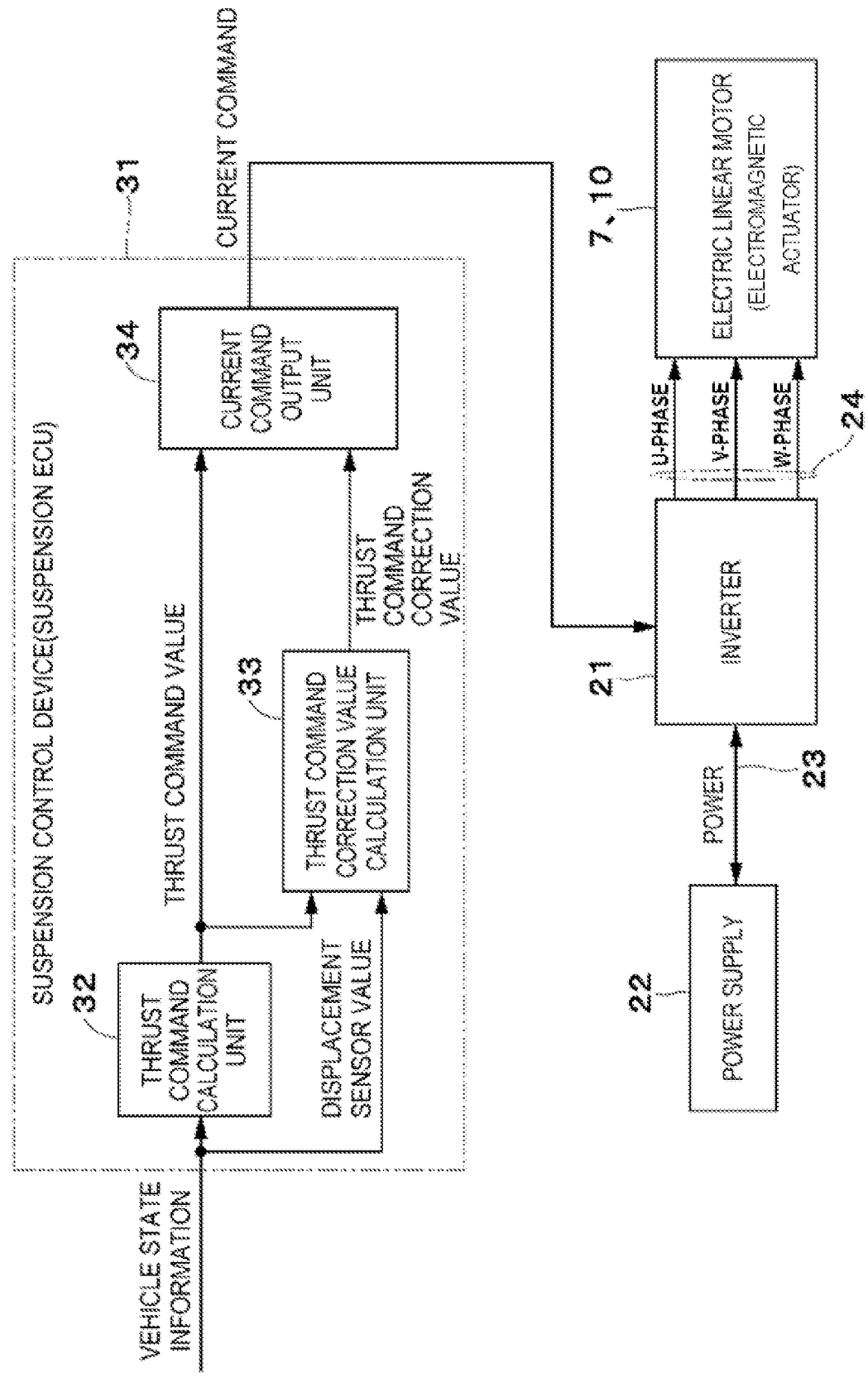
FIG. 3 is a block diagram illustrating the control device (vehicle behavior control device) and the force generating mechanism system (electromagnetic actuator system) in FIG. 1.

The thrust (generation force) of the electromagnetic actuators 7 and 10 is variably controlled by a controller 31. Therefore, as illustrated in FIG. 3, the electromagnetic actuators 7 and 10 are connected to a power supply 22 of the vehicle 1 through an inverter 21. The controller 31 that controls the electromagnetic actuators 7 and 10 is connected to the inverter 21. The controller 31 is a control device that controls the electromagnetic actuators 7 and 10, in other words, a vehicle behavior control device that controls the behavior of the vehicle 1 through the electromagnetic actuators 7 and 10. The controller 31 is also called an ECU for suspension or a suspension control device.

The controller 31 constitutes a force generating mechanism system, i.e., an electromagnetic actuator system (vehicle electromagnetic actuator system), together with the electromagnetic actuators 7 and 10. The controller 31 controls the generation force (thrust) of the electromagnetic actuators 7 and 10. For example, the controller 31 calculates a command value of the generation force (thrust command value and thrust target value) that is a force to be generated by the electromagnetic actuators 7 and 10, based on vehicle information (vehicle state information) and a specific control law (e.g., Skyhook control) to improve the ride comfort and steering stability of the vehicle. The controller 31 outputs a command signal (current command) corresponding to the calculated command value of the generation force (generation force command value) to the inverter 21.

The inverter 21 is connected to the power supply 22 of the vehicle via a power line 23 and is also connected to the electromagnetic actuators 7 and 10 via a power line 24. The inverter 21 is configured to include a plurality of switching elements, including transistors such as a field effect transistor (FET) and an insulated gate bipolar transistor (IGBT). The opening and closing of each switching element of the inverter 21 is controlled based on command signals from the controller 31. The inverter 21 drives the electromagnetic actuators 7 and 10 disposed on each of the wheels 3 and 4 based on the command signal (current command) from the controller 31 and power from the power supply 22 of the vehicle 1.

When the electromagnetic actuators 7 and 10 are in power running, power is supplied from the power supply 22 to the electromagnetic actuators 7 and 10 via the inverter 21. At this time, the inverter 21 generates three-phase (a U-phase, a V-phase and a W-phase) AC power from direct current power that is supplied from the power supply 22 through the power line 23, and supplies the power to the coils (the U-phase coil, the V-phase coil, and the W-phase coil) of each of the electromagnetic actuators 7 and 10 through the power line 24. Meanwhile, when the electromagnetic actuators 7 and 10 are regenerated, the power generated by the electromagnetic actuators 7 and 10 is returned to the power supply 22 via the inverter 21.

The power supply 22 of the electromagnetic actuators 7 and 10 may be configured by a power supply (power storage device) dedicated to the electromagnetic actuators 7 and 10 and/or an alternator rotationally driven by an engine, for example, when the vehicle 1 is equipped with the engine which is an internal combustion engine. When the alternator is used as the power supply 22, it may be installed with a capacitor or battery, if necessary, to supply (discharge) a peak power exceeding a power generated by the alternator and to store (charge) regenerated power. Meanwhile, in a hybrid vehicle (hybrid car) equipped with an engine and a driving electric motor or a vehicle (electric car) equipped with a driving electric motor, a large-capacity battery for driving the vehicle may be used as the power supply 22. In this case, the vehicle may be configured to receive power directly from the large-capacity battery for driving the vehicle, or to use power that has been stepped up or stepped down through a voltage conversion device such as a DC/DC converter.

The vehicle 1 is provided with a vehicle state detection means (not illustrated) for detecting a state of the vehicle 1. The vehicle state detection means corresponds to at least one of various state detection sensors (detection devices), such as a front-rear acceleration sensor, a lateral acceleration sensor, a wheel speed sensor, a steering angle sensor, a yaw rate sensor, a vehicle speed sensor, a vehicle-height sensor, a spring upper vertical acceleration sensor, a spring upper vertical speed sensor, a spring lower vertical acceleration sensor, and a spring lower vertical speed sensor. The vehicle state detection means detects a vehicle state (e.g., at least one of state quantities such as a front-rear acceleration, a lateral acceleration, a wheel speed, a steering angle, a yaw rate, a vehicle speed, a vehicle-height, a spring upper vertical acceleration, a spring upper vertical speed, a spring lower vertical acceleration, and a spring lower vertical speed). The vehicle state detection means outputs a signal corresponding to the detected vehicle state (detection value) as vehicle state information (FIG. 3) to the controller 31. In addition, the vehicle state information (FIG. 3) is not limited to the detected value (detection value), and may use an estimated (calculated) value (estimation value) using a state equation. That is, the vehicle state detection means may be configured to output a signal corresponding to the estimated (calculated) vehicle state (detection value) as vehicle state information, to the controller 31.

The controller 31 is connected to the vehicle state detection means and a separate controller (not illustrated) through a communication line (an information transmission line and a vehicle data bus) such as, for example, a controller area network (CAN), which is an in-vehicle LAN communication. The controller 31 is configured to include, for example, a microcomputer. The controller 31 controls the generation force of the electromagnetic actuators 7 and 10, based on various vehicle state information (vehicle state signal) including detection values and/or estimated values from the vehicle state detection means (state detection sensor) and/or the separate controller.

Therefore, a memory (storage) of the controller 31 stores a processing program for calculating thrust, which is to be generated by the electromagnetic actuators 7 and 10, based on the vehicle state information (vehicle state signal), and a processing program for outputting a command signal (current command) corresponding to the thrust to be generated. As for a control law (a control law of ride comfort and a control law of steering stability) for calculating the thrust of the electromagnetic actuators 7 and 10, for example, the Skyhook control law, a BLQ control law (bilinear optimal control law), or an H∞ control law may be used. The electromagnetic actuators 7 and 10 generate thrust (damping force) between the vehicle body 2 and the wheels 3 and 4 to appropriately suppress the vertical movements of the wheels 3 and 4, thereby suppressing vibration of the vehicle body 2.

The force generating mechanism system (vehicle electromagnetic actuator system) according to the embodiment has the configuration described above, and operations thereof will be described subsequently.

For example, when the electromagnetic actuators 7 and 10 are disposed vertically and interposed in a vertical direction between the vehicle body 2, which is the spring upper member, and the wheels 3 and 4, which are the spring lower members, of the vehicle 1, if the vehicle 1 vibrates in the vertical direction, a force is applied to the electromagnetic actuators 7 and 10 in the stroke direction (axial direction). According to this force, the stator 11 (armature 14) and the mover 12 (permanent magnets 13) of the electromagnetic actuators 7 and 10 move relative to each other. At this time, based on the command signal from the controller 31, by allowing a predetermined current to flow on the coils 16 of the armature 14 (the U-phase coil 16A, the V-phase coil 16B, and the W-phase coil 16C) according to positions of the permanent magnets 13, the generation force (generated thrust) of the electromagnetic actuators 7 and 10 may be adjusted. Accordingly, the ride comfort and steering stability of the vehicle 1 may be improved.

However, the thrust generated by the electromagnetic actuator including the permanent magnet and the armature changes (varies) according to a position and a speed of the mover at that time and a current flowing through the armature (coils). Due to the change in thrust, it is difficult to generate thrust according to a command value from the electromagnetic actuator. Accordingly, for example, in the case of an electromagnetic suspension including the electromagnetic actuator, there is a possibility that the ride comfort of a vehicle may be decreased. That is, a linear electromagnetic actuator (linear motor) generates a thrust pulsation, which is accompanied with cogging force (detent force) generated according to a stroke position, and an iron loss by a stroke speed. As a result of a detailed analysis, it was found that there is a difference in thrust that may be actually output by a direction where it is desired to generate the thrust and a direction of the stroke at that time.

That is, the thrust of the linear electromagnetic actuator changes depending on a stroke position, a stroke speed, a stroke direction, a magnitude of current, and a current flowing direction. Therefore, in the embodiment, the change in thrust of the electromagnetic actuator is estimated from these pieces of information, and the command value is corrected to suppress the change in thrust. By this correction, the ride comfort of the vehicle is improved by making the thrust generated by the electromagnetic actuator close to the command value. That is, in the embodiment, the amount of change in the thrust of the electromagnetic actuator is estimated based on the stroke position and thrust command value (current command value) of the electromagnetic actuator (linear motor), and the stroke speed and stroke direction at that time. Then, the thrust command value is corrected using the estimated amount of change such that the thrust of the electromagnetic actuator is generated in accordance with the thrust command value. In this case, an operating mode is determined from a position, a speed, and a direction of the armature with respect to the permanent magnet for the thrust command value, and the thrust (thrust command value) is corrected based on a result of the determination. Hereinafter, these matters will be described.

Figure 7:
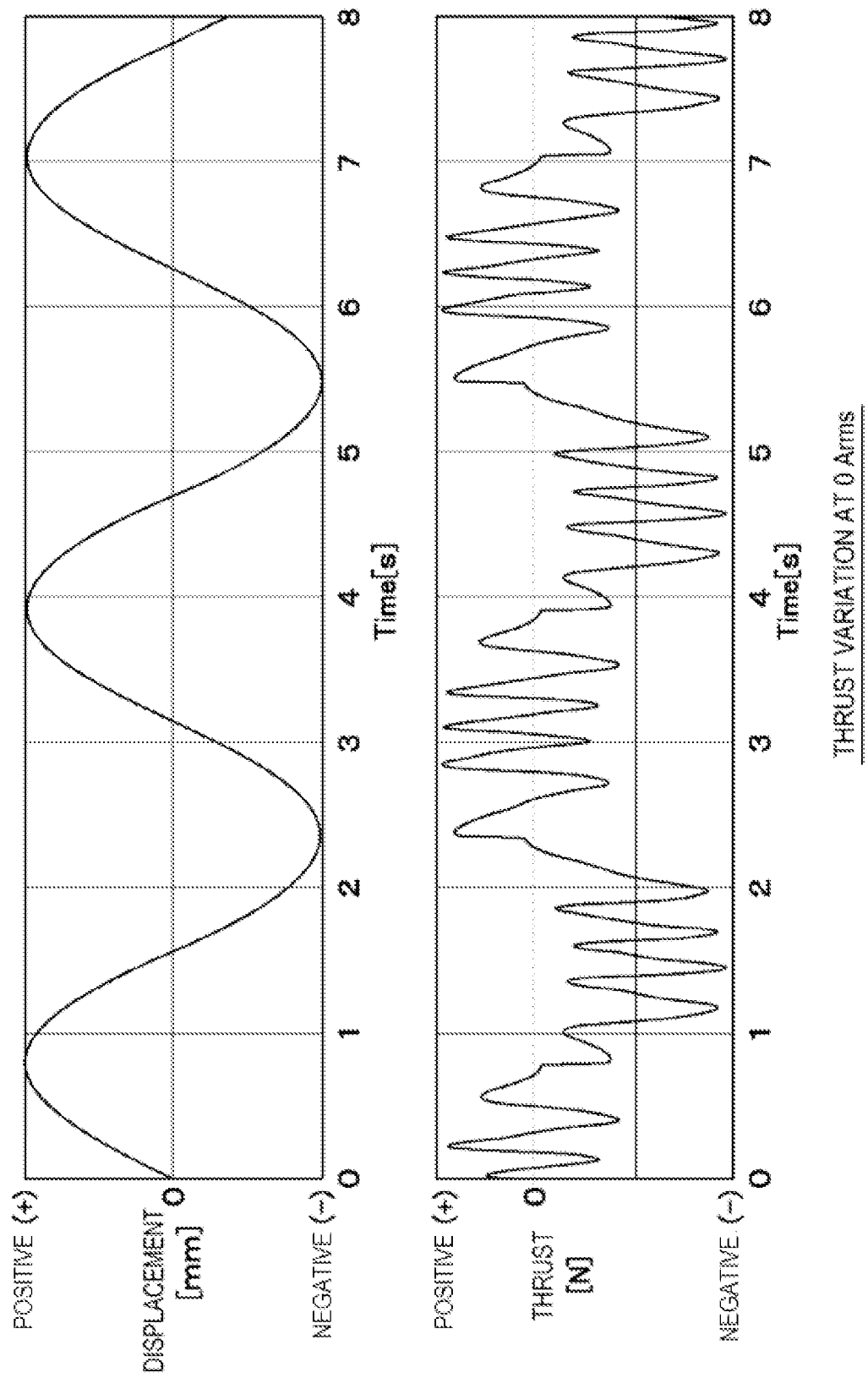
FIG. 7 is a characteristic diagram illustrating changes in "displacement" and "thrust" over time of the electromagnetic actuator (current: 0 Arms).

First, FIG. 7 illustrates changes in "displacement" and "thrust" over time of the electromagnetic actuators 7 and 10. The current of the electromagnetic actuators 7 and 10 is 0 Arms. That is, FIG. 7 illustrates changes in the "displacement" and "thrust" over time of the electromagnetic actuators 7 and 10 when the current supplied to the electromagnetic actuators 7 and 10 is 0 Arms. The thrust of FIG. 7 corresponds to a force (a force by which iron components of the permanent magnet 13 and the armature 14 attract each other) generated by the electromagnetic actuators 7 and 10 in a state where no power is supplied to the electromagnetic actuators 7 and 10. A positive (+) thrust is a thrust generated in a direction of extending the electromagnetic actuators 7 and 10, and a negative (−) thrust is a thrust generated in a direction of compressing the electromagnetic actuators 7 and 10. That is, the positive (+) thrust is a force that helps extension of the electromagnetic actuators 7 and 10, and the negative (−) thrust is a force that helps compression of the electromagnetic actuators 7 and 10.

As illustrated in FIG. 7, the thrust changes even when the current of the electromagnetic actuators 7 and 10 is 0 Arms. That is, the thrust generated in the electromagnetic actuators 7 and 10 changes due to the influence of cogging force. Since the ride comfort is reduced due to the change in thrust, it is important to reduce the change in thrust and generate the thrust in accordance with the thrust command value in order to improve the ride comfort. Meanwhile, the thrust varies depending on the stroke position, the stroke speed, and flowing current. Therefore, the thrust generated based on the stroke position, the stroke speed, and flowing current is estimated, and the thrust command value is corrected such that the thrust may be generated in accordance with the thrust command value.

Here, thrust F(x) at displacement x is expressed by the following Equation 1. The thrust F(x) is a thrust (generation force) generated at displacement x.

$$F(x) = F\,d(x) + F\,\alpha(v) \pm \frac{F\,s}{2} \qquad \text{[Equation 1]}$$

Figure 8:
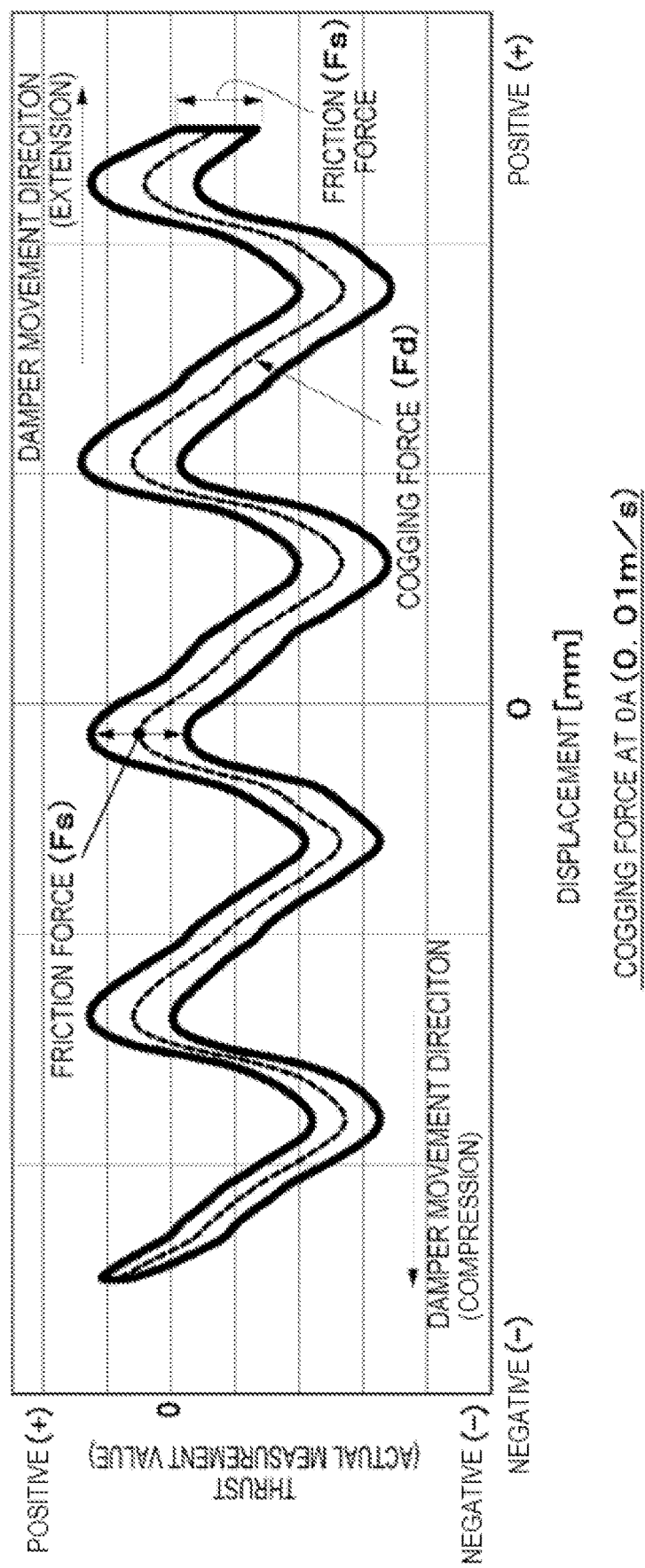
FIG. 8 is a characteristic diagram illustrating a relationship of "displacement" and "actual value of thrust" of the electromagnetic actuator (current: 0 Arms, speed: 0.01 m/s).

In Equation 1, "F(x)" is "thrust," "Fd(x)" is "cogging force," "Fα(v)" is "speed-dependent term," and "Fs" is "friction force." FIG. 8 illustrates a relationship between the "displacement" and the "thrust (actual value)" of the electromagnetic actuators 7 and 10. The current of the electromagnetic actuators 7 and 10 is 0 Arms, and the speed (stroke speed) of the electromagnetic actuators 7 and 10 is 0.01 m/s. That is, FIG. 8 is a result of an excitation test when the electromagnetic actuators 7 and 10, which are dampers, are excited at low speed (0.01 m/s).

The solid line in FIG. 8 refers to actual measurement values of the thrust of the electromagnetic actuators 7 and 10, and the broken line in FIG. 8 refers to the cogging force Fd(x). The cogging force Fd(x) may be acquired by subtracting the friction force Fs from the actual measurement value when the electromagnetic actuator is excited at low speed (0.01 m/s), and may be used as a position-thrust map. The friction force Fs may be acquired from a difference in thrust when the extension stroke and the compression stroke are reversed (when the stroke is reversed). The friction force Fs is a force that interferes with a movement direction. When the thrust F(x) generated in the direction of extending the electromagnetic actuators 7 and 10 is set to be positive (+) and the thrust F(x) generated in the direction of compressing the electromagnetic actuators 7 and 10 is set to be negative (−), the friction force Fs when the electromagnetic actuators 7 and 10 are displacing in an extension direction becomes negative (−), and the friction force Fs when the electromagnetic actuators 7 and 10 are displacing in a compression direction becomes positive (+).

Figure 9:
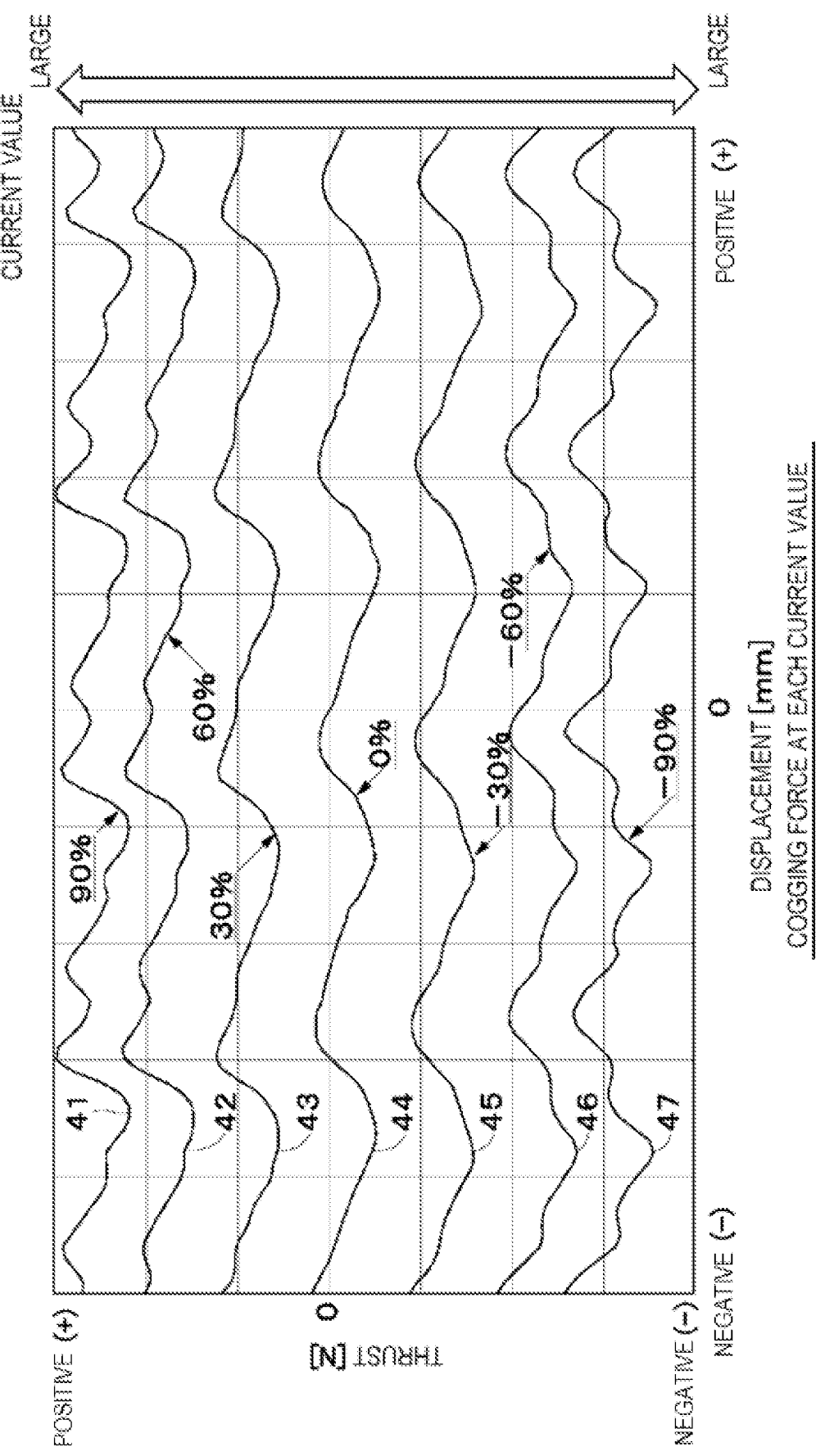
FIG. 9 is a characteristic diagram illustrating a relationship of "displacement" and "thrust" of the electromagnetic actuator (at each current value).

Next, FIG. 9 illustrates a relationship between the "displacement" and the "thrust" of the electromagnetic actuators 7 and 10 at each current value. The positive (+) thrust is the thrust generated in the direction of extending the electromagnetic actuators 7 and 10, and the negative (−) thrust is the thrust generated in the direction of compressing the electromagnetic actuators 7 and 10. In FIG. 9, a characteristic line 41 has a current value of 90%, a characteristic line 42 has a current value of 60%, a characteristic line 43 has a current value of 30%, a characteristic line 44 has a current value of 0% (0 A), a characteristic line 45 has a current value of −30%, a characteristic line 46 has a current value of −60%, and a characteristic line 47 has a current value of −90%. In this case, a current value of 100% is set as a maximum allowable current value in a positive direction (extension direction), and a current value of −100% is set as a maximum allowable current value in a negative direction (compression direction). As illustrated in FIG. 9, the thrust pulsation tends to increase as the current value increases. In addition, since the pulsation also changes depending on the direction (±) of the current, two factors of the current and position are considered for the cogging force Fd.

Figure 10:
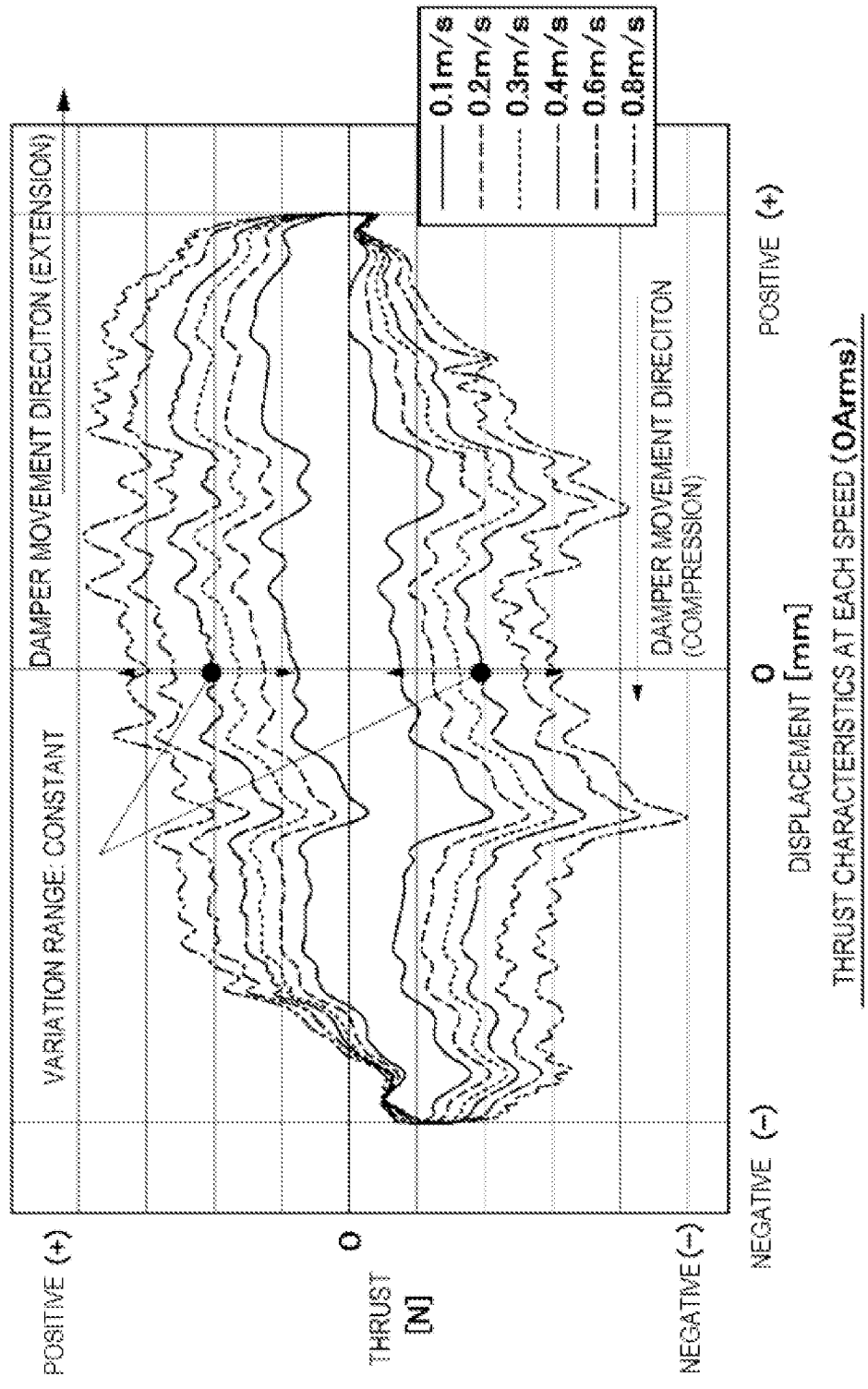
FIG. 10 is a characteristic diagram illustrating a relationship of "displacement" and "thrust" of the electromagnetic actuator (current: 0 Arms) at each speed.
Figure 11:
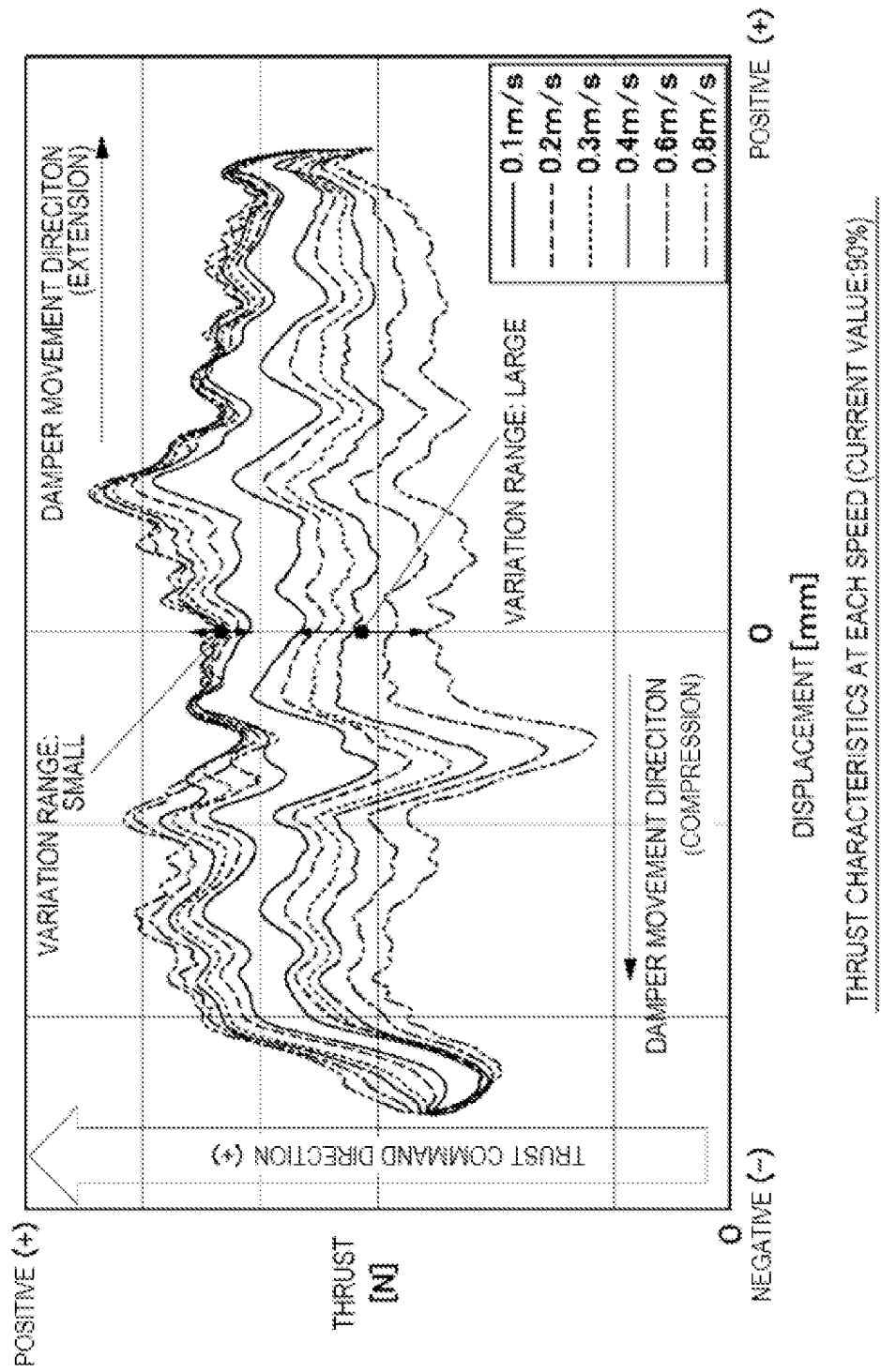
FIG. 11 is a characteristic diagram illustrating a relationship of "displacement" and "thrust" of the electromagnetic actuator (current: 90%) at each speed.
Figure 12:
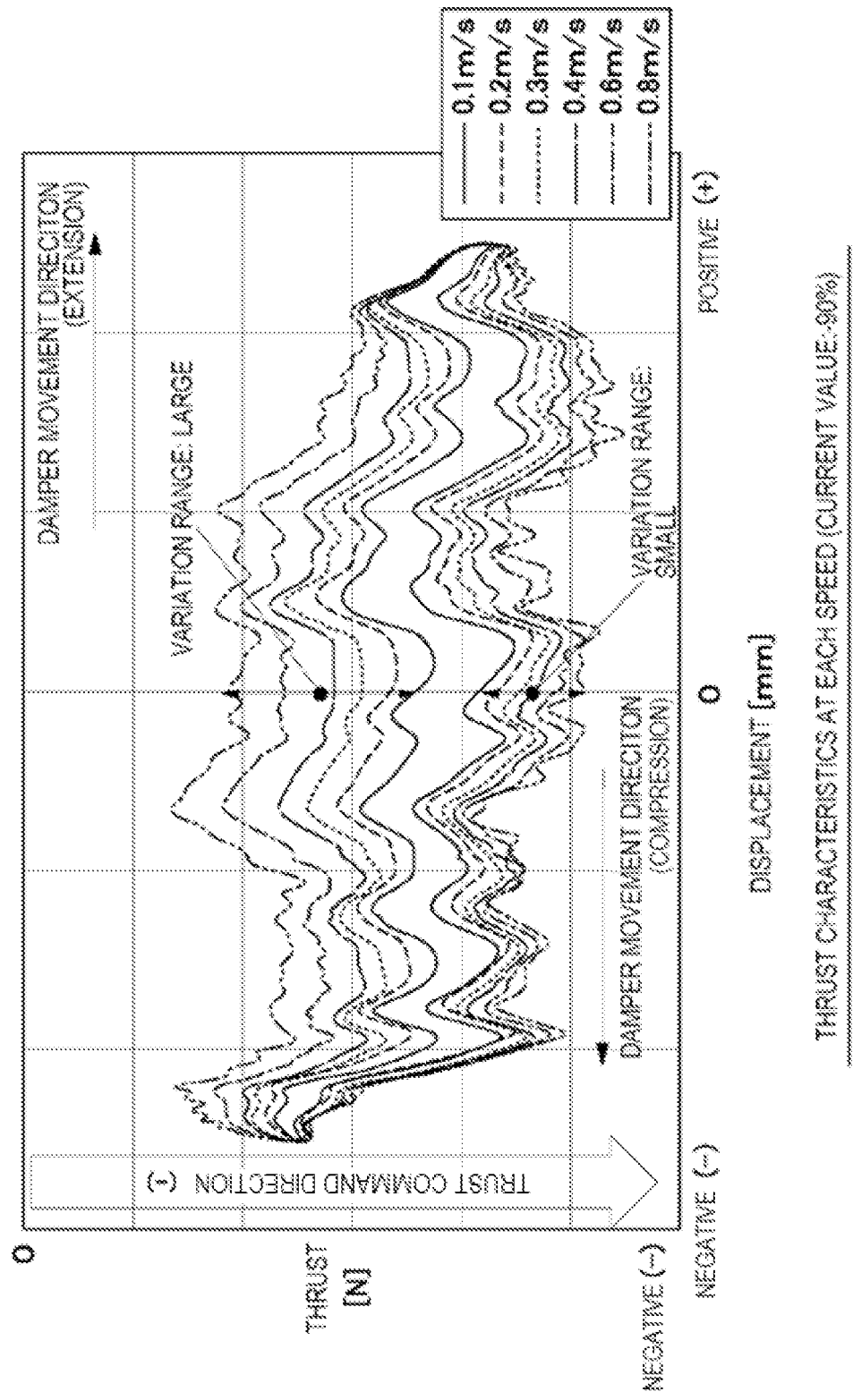
FIG. 12 is a characteristic diagram illustrating a relationship of "displacement" and "thrust" of the electromagnetic actuator (current: −90%) at each speed.

Next, a speed-dependent factor (the speed-dependent term Fα(v) in the Equation 1) of the electromagnetic actuators 7 and 10, that is, factors (induced voltage and iron loss) of a change in thrust that depend on a speed will be examined. FIG. 10 illustrates a relationship between the "displacement" and the "thrust" of the electromagnetic actuators 7 and 10 at each speed when the current supplied to the electromagnetic actuators 7 and 10 is 0 Arms. FIG. 11 illustrates a relationship between the "displacement" and the "thrust" of the electromagnetic actuators 7 and 10 at each speed when the current supplied to the electromagnetic actuators 7 and 10 is 90%. FIG. 12 illustrates a relationship between the "displacement" and the "thrust" of the electromagnetic actuators 7 and 10 at each speed when the current supplied to the electromagnetic actuators 7 and 10 is −90%. As illustrated in FIGS. 10, 11, and 12, a variation range of the thrust of the electromagnetic actuators 7 and 10 changes depending on "a current value," "a direction where it is desired to generate thrust," and "a direction of a stroke at that time." Specifically, the relationship between a thrust command direction and a stroke direction, and a thrust variation amount is shown as in the following Table 1.

TABLE 1

| Relationship between Command Direction and Stroke Direction and Thrust Variation Amount | | Thrust Command Direction | |
|---|---|---|---|
| | | Extension Direction | Compression Direction |
| Stroke Direction | Extension Direction | Small Thrust Variation | Large Thrust Variation |
| | Compression Direction | Large Thrust Variation | Small Thrust Variation |

Figure 4:
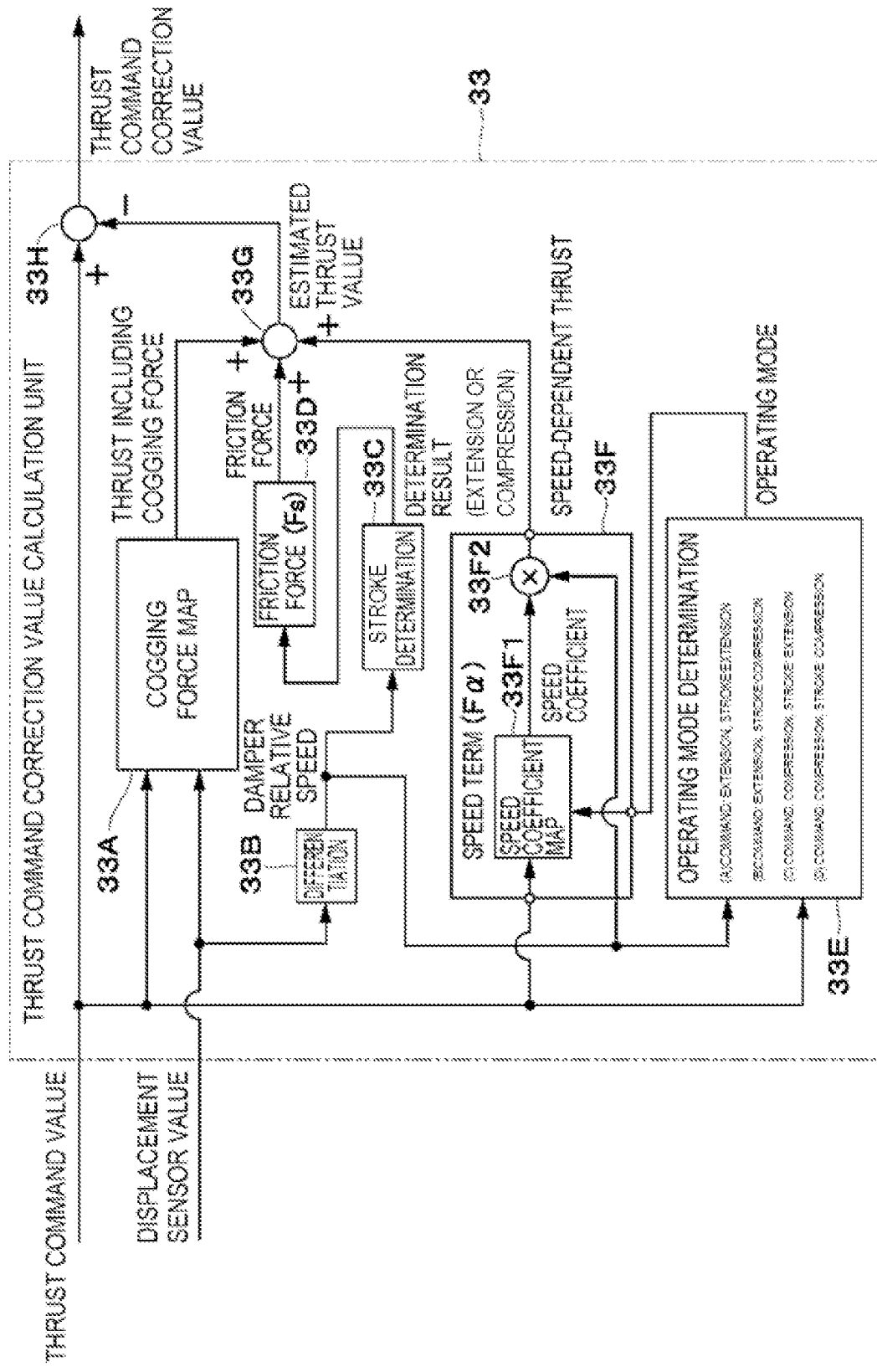
FIG. 4 is a block diagram illustrating a "thrust command correction value calculation unit" in FIG. 3.
Figure 5:
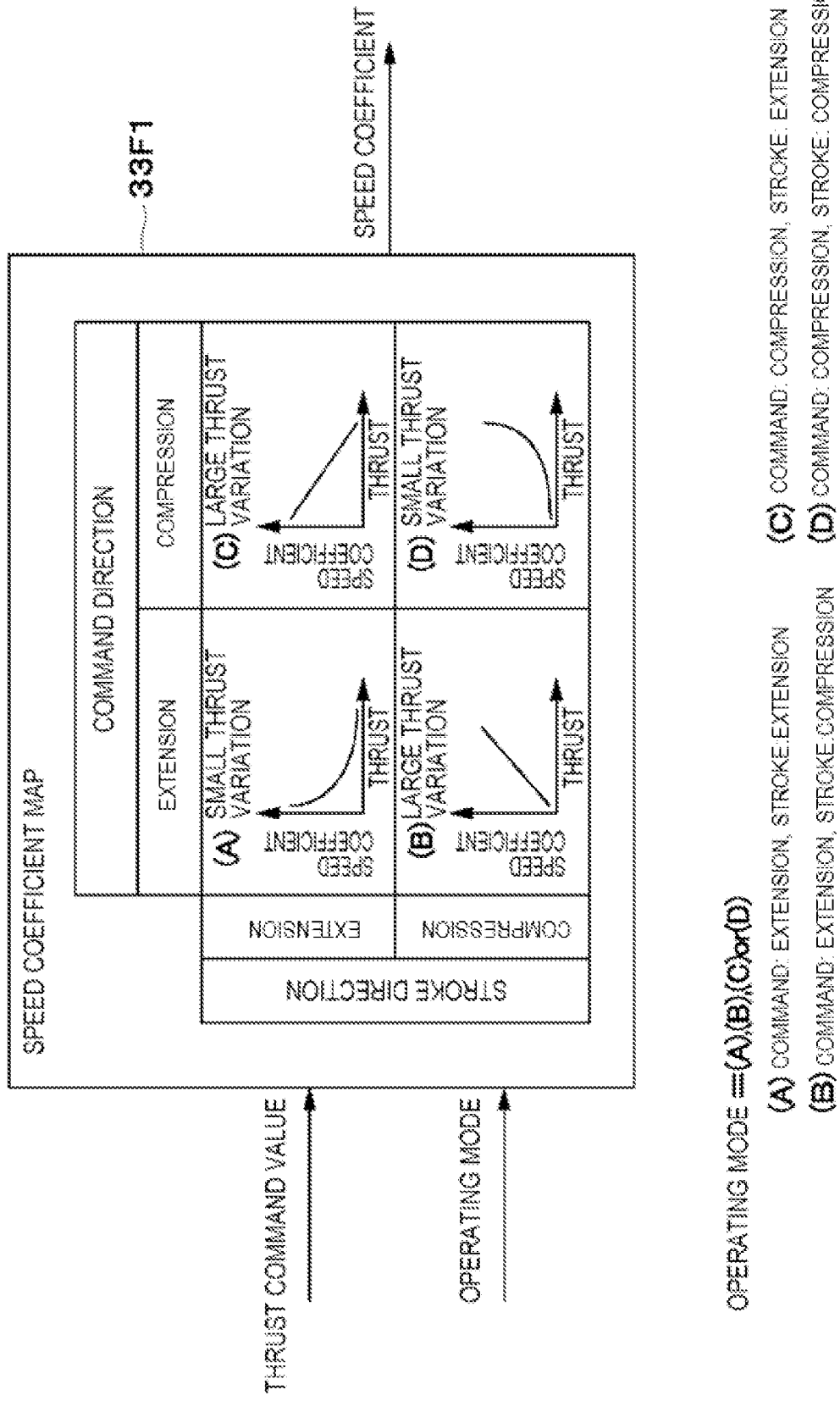
FIG. 5 is a block diagram illustrating a "speed coefficient map" in FIG. 4.

Therefore, in the embodiment, the speed-dependent term Fα(v) in the thrust F(x) of the Equation 1 is set to a value acquired by considering the thrust command value, the thrust command direction, and the stroke direction. That is, in the embodiment, a correction value for the thrust command value is determined by considering the thrust command direction and the stroke direction (i.e., the operating mode). In this case, as illustrated in FIGS. 3 to 5, the controller 31 calculates a correction value for the thrust pulsation (more specifically, a speed-dependent thrust) according to the thrust command value (current command value) of the electromagnetic actuators 7 and 10 and the stroke speed and stroke direction (operating mode) at that time. Hereinafter, the controller 31 having a function for correcting the thrust command value (current command value) will be described.

As illustrated in FIG. 3, the controller 31 includes a thrust command calculation unit 32, a thrust command correction value calculation unit 33, and a current command output unit 34. Information (signal) corresponding to the state quantity of the vehicle 1, i.e., vehicle state information (vehicle state signal), is input to the thrust command calculation unit 32 via a communication line such as CAN. The vehicle state information (vehicle state signal) corresponds to a detection value (detection signal) and/or an estimation value (estimation signal) from the vehicle state detection means (state detection sensor). The vehicle state information (vehicle state signal) includes a "displacement sensor value." The displacement sensor value corresponds to a displacement amount (stroke amount) of the electromagnetic actuators 7 and 10, that is, a detection value of a displacement sensor (stroke sensor) that detects the relative displacement of the mover 12 (permanent magnets 13) and the stator 11 (armature 14). The displacement amount (stroke amount) of the electromagnetic actuators 7 and 10 may utilize an estimated value calculated from a state equation, instead of the detection value by the displacement sensor (stroke sensor). As described below, the displacement sensor value, that is, a displacement value (stroke value) of the electromagnetic actuators 7 and 10, is input to the thrust command correction value calculation unit 33.

The thrust command calculation unit 32 calculates a "thrust command value" that is a command for thrust to be generated from the electromagnetic actuators 7 and 10, based on the vehicle state information (vehicle state signal). The thrust command calculation unit 32 outputs a signal (thrust command value signal) corresponding to the calculated thrust command value to the thrust command correction value calculation unit 33 and the current command output unit 34. The thrust command value is input to the thrust command correction value calculation unit 33 from the thrust command calculation unit 32. The displacement sensor value is input to the thrust command correction value calculation unit 33. The thrust command correction value calculation unit 33 calculates a "thrust command correction value" that is a correction value for the thrust command value, based on the thrust command value and the displacement sensor value. As described below, the thrust command correction value is a correction value for compensating for a thrust variation, which is accompanied by the thrust pulsation from the thrust command value, i.e., a correction value necessary for suppressing the thrust variation over the thrust command value. The thrust command correction value calculation unit 33 outputs a signal (thrust command correction value signal) corresponding to the calculated thrust command correction value to the current command output unit 34.

The thrust command value from the thrust command calculation unit 32 and the thrust command correction value from the thrust command correction value calculation unit 33 are input to the current command output unit 34. The current command output unit 34 outputs a thrust command value after correction based on the thrust command value and the thrust command correction value. For example, the thrust command value after correction is calculated by adding the thrust command value and the thrust command correction value. The current command output unit 34 outputs a "command signal (current command)" corresponding to the calculated thrust command value after correction to the inverter 21. Accordingly, the electromagnetic actuators 7 and 10 may generate thrust based on the vehicle state information. At this time, the command signal (current command) corresponding to the thrust command value after correction is output from the current command output unit 34. Thus, a command signal (current command) in which a thrust variation based on the thrust pulsation is suppressed is input to the inverter 21. Accordingly, the ride comfort and/or steering stability of the vehicle 1 may be improved at a high level.

FIG. 4 illustrates the thrust command correction value calculation unit 33. The thrust command correction value calculation unit 33 calculates a thrust command correction value necessary for suppressing the thrust variation (thrust variation) over the thrust command value, based on the thrust command value and the displacement sensor value. That is, the thrust command correction value calculation unit 33 calculates a correction value (thrust command correction value) for the thrust command value based on the thrust command value (current command value) of the electromagnetic actuators 7 and 10 and the operating mode (stroke speed and stroke direction) at that time. To this end, the thrust command correction value calculation unit 33 includes a cogging force map unit 33A, a differentiation unit 33B, a stroke determination unit 33C, a friction force unit 33D, an operating mode determination unit 33E, a speed term unit 33F, an addition unit 33G, and a subtraction unit 33H.

The thrust command value is input from the thrust command calculation unit 32 to the cogging force map unit 33A. The displacement sensor value, i.e., the displacement amount (stroke amount) of the electromagnetic actuators 7 and 10, is input to the cogging force map unit 33A. The displacement amount (stroke amount) corresponds to the amount of the relative displacement (relative displacement amount) of the mover 12 (permanent magnets 13) and the stator 11 (armature 14) of the electromagnetic actuators 7 and 10. The displacement amount (stroke amount and relative displacement amount) may use an estimated value calculated using a state equation, instead of the detection value. In any case, the "displacement sensor value" corresponding to the displacement amount of the electromagnetic actuators 7 and 10 at that time and the "thrust command value (more specifically, a current value corresponding to the thrust command value)" at that time are input to the cogging force map unit 33A.

In the cogging force map unit 33A, for example, a map as illustrated in the FIG. 9 described above, that is, the relationship between the "displacement" and the "thrust" of the electromagnetic actuators 7 and 10 at each "current value", is stored. The cogging force map unit 33A calculates the thrust from the input "displacement sensor value" and the "thrust command value (i.e., a thrust current value converted from the thrust command value)" and the "map (in FIG. 9)". For example, when the thrust current value corresponding to the thrust command value is 90%, the thrust may be calculated based on the characteristic line 41 in FIG. 9 and the displacement (displacement sensor value) at that time. For example, when the thrust current value corresponding to the thrust command value is −30%, the thrust may be calculated based on the characteristic line 45 in FIG. 9 and the displacement (displacement sensor value) at that time. The thrust, that is, the thrust calculated from the cogging force map unit 33A, is a thrust according to the "displacement (displacement sensor value)" and "current value (thrust current value)" at that time (present time).

The thrust corresponds to the sum of the thrust generated based on the "current value corresponding to the thrust command value (thrust current value)" and the thrust (cogging force) generated according to the "displacement (displacement sensor value)." In other words, the thrust includes the thrust generated based on the current value corresponding to the thrust command value (current command value), as well as the thrust of a variation due to the cogging force. The cogging force map unit 33A outputs the calculated thrust, that is, the thrust including the cogging force, to the addition unit 33G. The thrust (thrust including the cogging force) output from the cogging force map unit 33A corresponds to "Fd(x)" in the Equation 1 described above.

The "displacement sensor value" is input to the differentiation unit 33B. The differentiation unit 33B calculates a relative speed (damper relative speed) of the electromagnetic actuators 7 and 10 by differentiating the input "displacement sensor value", i.e., the displacement of the electromagnetic actuators 7 and 10. The differentiation unit 33B outputs the calculated relative speed of the electromagnetic actuators 7 and 10 to the stroke determination unit 33C, the speed term unit 33F (multiplication unit 33F2), and the operating mode determination unit 33E. The relative speed (damper relative speed) of the electromagnetic actuators 7 and 10 is input to the stroke determination unit 33C from the differentiation unit 33B. The stroke determination unit 33C determines a movement direction of the electromagnetic actuators 7 and 10, that is, whether the movement direction is in an extension direction ("extension") or in a compression direction ("compression"), from the (+)/(−) of the input relative speed. The stroke determination unit 33C outputs a determination result, that is, a determination result whether the movement direction t direction) of the electromagnetic actuators 7 and 10 is "extension" or "compression," to the friction unit 33D.

The determination result ("extension" or "compression") is input to the friction force unit 33D from the stroke determination unit 33C. The friction force unit 33D has the friction force of the electromagnetic actuators 7 and 10, which has been acquired in advance. That is, the friction force unit 33D stores a friction force (difference in thrust when the stroke is reversed) acquired from the actual measurement value of the thrust as illustrated in FIG. 8, as described above. When "extension" is input from the stroke determination unit 33C, the friction force unit 33D outputs a negative (−) friction force to the addition unit 33G. When "compression" is input from the stroke determination unit 33C, the friction force unit 33D outputs a positive (+) friction force to the addition unit 33G. The friction force is, for example, a constant (difference in thrust when the stroke is reversed).

The friction force output from the friction force unit 33D corresponds to "±Fs/2" in the Equation 1 described above. The friction force refers to a deviation amount of thrust from a thrust command value, based on the friction of the electromagnetic actuators 7 and 10. In the embodiment, since the difference in thrust when the stroke is reversed is set as "Fs," the friction force output from the friction force unit 33D is "±Fs/2." In this regard, for example, when half of the difference in thrust when the stroke is reversed is set as "Fs," the friction force output from the friction force unit 33D may be "±Fs."

The relative speed (damper relative speed) of the electromagnetic actuators 7 and 10 is input to the operating mode determination unit 33E from the differentiation unit 33B. The thrust command value is input to the operating mode determination unit 33E from the thrust command calculation unit 32. The operating mode determination unit 33E determines the operating mode of the electromagnetic actuators 7 and 10 at that time (present time), based on the relative speed and the thrust command value. In this case, from the relative speed, it may be determined whether a current stroke direction (actual stroke direction) of the electromagnetic actuators 7 and 10 is "extension" or "compression." From the thrust command value, it may be determined whether the thrust command direction (command direction) is "extension" or "compression."

The operating mode determination unit 33E determines one of the following four patterns (operating modes) as an operating mode.

(A) Command direction "Extension," Actual stroke direction "Extension"
(B) Command direction "Extension," Actual stroke direction "Compression"
(C) Command direction "Compression," Actual stroke direction "Extension"
(D) Command direction "Compression," Actual stroke direction "Compression"

The operating mode determination unit 33E outputs a determination result of the operating mode, i.e., one of the above (A) to (D), to the speed term unit 33F (speed coefficient map unit 33F1). The relative speed (damper relative speed) of the electromagnetic actuators 7 and 10 is input to the speed term unit 33F from the differentiation unit 33B. The thrust command value is input to the speed term unit 33F from the thrust command calculation unit 32. The operating mode is input to the speed term unit 33F from the operating mode determination unit 33E. The speed term unit 33F calculates a speed-dependent thrust based on the relative speed and thrust command value of the electromagnetic actuators 7 and 10 and the operating mode. The speed-dependent thrust refers to the amount of thrust variation, which depends on the stroke speed of the electromagnetic actuators 7 and 10, for example, the deviation amount of thrust from the thrust command value, which depends on the stroke speed. The speed term unit 33F outputs the calculated speed-dependent thrust to the addition unit 33G.

Therefore, the speed term unit 33F includes the speed coefficient map unit 33F1 and the multiplication unit 33F2. The thrust command value is input to the speed coefficient map unit 33F1 from the thrust command calculation unit 32. The operating mode is input to the speed coefficient map unit 33F1 from the operating mode determination unit 33E. As illustrated in FIG. 5, the speed coefficient map unit 33F1 calculates a speed coefficient according to the thrust command value at that time based on the thrust command value and the operating mode. The speed coefficient is a coefficient, which is multiplied by the relative speed (damper relative speed) of the electromagnetic actuators 7 and 10. In the speed coefficient map unit 33F1, a speed coefficient map (relationship between "thrust" and "speed coefficient") corresponding to each of (A) to (D) is stored, as illustrated in FIG. 5. That is, in the speed coefficient map unit 33F1, a speed coefficient map when the operating mode is (A), a speed coefficient map when the operating mode is (B), a speed coefficient map when the operating mode is (C), and a speed coefficient map when the operating mode is (D) are stored.

When the operating mode is (A) above, that is, when the command direction is "extension" and the actual stroke direction is "extension," a thrust variation tends to be small. Therefore, in this case, the speed coefficient map as illustrated in the box of "(A)" in FIG. 5, that is, a speed coefficient map in which the speed coefficient decreases in a curved manner over the thrust, is used to calculate the speed coefficient according to the thrust (thrust command value) at that time. When the operating mode is (B) above, that is, when the command direction is "extension" and the actual stroke direction is "compression," the thrust variation tends to be large. Therefore, in this case, a speed coefficient map as illustrated in the box of "(B)" in FIG. 5, that is, a speed coefficient map in which the speed coefficient increases linearly over the thrust, is used to calculate the speed coefficient according to the thrust (thrust command value) at that time.

When the operating mode is the (C), that is, when the command direction is "compression" and the actual stroke direction is "extension", the thrust variation tends to be large. Therefore, in this case, a speed coefficient map such as that illustrated in the box of "(C)" in FIG. 5, for example, a speed coefficient map in which a speed coefficient decreases linearly over the thrust, is used to calculate the speed coefficient according to the thrust (thrust command value) at that time. When the operating mode is (D) above, that is, when the command direction is "compression" and the actual stroke direction is "compression," the thrust variation tends to be small. Therefore, in this case, a speed coefficient map such as that illustrated in the box of "(D)" in FIG. 5, that is, a speed coefficient map in which a speed coefficient increases in a curved manner over the thrust is used to calculate the speed coefficient according to the thrust (thrust command value) at that time.

In other words, the speed coefficient map unit 33F1 may calculate four coefficients (speed coefficients) from four maps (speed coefficient maps) according to thrust command values, and determine the coefficient (speed coefficient) to be output from the speed coefficient map unit 33F1 according to the operating mode. The speed coefficient map unit 33F1 outputs the calculated speed coefficient to the multiplication unit 33F2. The relative speed (damper relative speed) of the electromagnetic actuators 7 and 10 is input to the multiplication unit 33F2 from the differentiation unit 33B. The speed coefficient is input to the multiplication unit 33F2 from the speed coefficient map unit 33F1. The multiplication unit 33F2 multiplies the relative speed (damper relative speed) of the electromagnetic actuators 7 and 10 by the speed coefficient, thereby calculating the speed-dependent thrust. In this manner, the speed term unit 33F acquires the speed-dependent thrust, which is a correction value for the thrust command value, by multiplying the speed coefficient according to the operating mode (command direction and actual stroke direction) by the relative speed (damper relative speed).

That is, the speed term unit 33F acquires the speed-dependent thrust, which is the correction value for the thrust command value by correcting a gradient of the relative speed (damper relative speed) according to the operating mode (command direction and actual stroke direction). The multiplication unit 33F2 of the speed term unit 33F outputs the calculated speed-dependent thrust to the addition unit 33G. The speed-dependent thrust output from the speed term unit 33F (multiplication unit 33F2) corresponds to "Fα(v)" in the Equation 1 described above. That is, the speed-dependent thrust is a deviation amount of the thrust from the thrust command value, which depends on the speed (stroke speed) of the electromagnetic actuators 7 and 10.

The thrust including the cogging force, that is, the amount of thrust, which is deviated from the thrust command value by the cogging force, is input to the addition unit 33G, from the cogging force map unit 33A. The friction force is input to the addition unit 33G from the friction force unit 33D. The speed-dependent thrust is input to the addition unit 33G from the speed term unit 33F. The addition unit 33G adds the thrust including the cogging force, the friction force, and the speed-dependent thrust. That is, the addition unit 33G calculates the thrust of the Equation 1. The addition unit 33G outputs the calculated thrust as a thrust estimation value to the subtraction unit 33H. The thrust estimation value is a thrust estimated by Equation 1 from the thrust command value, the stroke position, and the stroke speed at that time. In other words, the thrust estimation value corresponds to a thrust estimation value with a "thrust deviation due to cogging force," a "thrust deviation due to friction force," and a "thrust deviation dependent on a speed" with respect to the thrust command value, that is, an estimation value of the thrust, which will actually occur.

The thrust command value is input from the thrust command calculation unit 32 to the subtraction unit 33H. In addition, the thrust estimation value is input from the addition unit 33G to the subtraction unit 33H. The subtraction unit 33H subtracts the thrust estimation value from the thrust command value. Accordingly, the subtraction unit 33H calculates a thrust command correction value, which is a correction amount for the thrust command value. For example, when the thrust command value is 2000 N and the thrust estimation value is 1800 N, the subtraction unit 33H outputs 200 N as the thrust command correction value. The thrust command correction value is a correction value necessary for the thrust command value in order to suppress a thrust variation. The subtraction unit 33H outputs the calculated thrust command correction value to the current command output unit 34. Accordingly, the current command output unit 34 may output a command signal (current command) in which changes in thrust based on the thrust pulsation are suppressed to the inverter 21.

In this manner, the thrust command correction value calculation unit 33 outputs the thrust command correction value. In this case, the thrust command correction value calculation unit 33 estimates and acquires the amount of change in thrust, which is generated in the electromagnetic actuators 7 and 10, based on the "thrust command value" and the "displacement sensor value". The thrust command correction value calculation unit 33 outputs the "thrust command correction value" by using the acquired estimated value as an "estimated thrust value" and acquiring a difference between the estimated thrust value and the thrust command value in the subtraction unit 33H. The thrust estimation value is acquired from the speed-dependent thrust that depends on a stroke speed, such as a detent force (cogging force), a friction force, and an induced voltage or iron loss.

The detent force (cogging force) that occurs depending on a stroke position is acquired by acquiring the stroke position using the displacement sensor value and calculating a force that occurs at that time. The detent force (cogging force) also changes depending on the thrust command value (current command value). Therefore, the cogging force map unit 33A sets a map in which two variables of the displacement sensor value and the thrust command value are input, and the thrust generated according to the stroke position and the thrust command value is output.

Regarding the friction force, the stroke speed (damper relative speed) acquired by differentiating the displacement sensor value in the differentiation unit 33B is used. In this case, the stroke determination unit 33C determines a sign of the stroke speed. The friction force unit 33D determines the sign of the friction force to be added based on a sign determination result of the stroke determination unit 33C and outputs the sign as the friction force. Meanwhile, the thrust generated depending on the stroke speed changes depending on the stroke speed, the stroke direction at that time, and further, the thrust command direction and thrust command amount at that time, due to the influence of the induced voltage or iron loss. Therefore, the thrust generated depending on the stroke speed is calculated as follows.

First, a coefficient according to the thrust command amount is calculated in the speed coefficient map unit 33F1. This coefficient is calculated using a speed coefficient map that takes the thrust command amount as input and the coefficient as output. In this case, since the calculated coefficient changes according to the four operating modes, four speed coefficient maps corresponding to each operating mode are used. The four operating modes are (A) to (D) described above.

The operating mode determination unit 33E determines one of the operating modes of the (A) to (D), for the current stroke state of the electromagnetic actuators 7 and 10, from the stroke speed and the thrust command value acquired by differentiating the displacement sensor value. Based on a result of the determination, the speed coefficient map unit 33F1 selects a speed coefficient map that matches the corresponding operating mode. The coefficient output from the speed coefficient map unit 33F1 and the stroke speed are multiplied by the multiplication unit 33F2, and a result of this multiplication is output as the speed-dependent thrust. The detent force (cogging force), the friction force, and the speed-dependent thrust, which are acquired in this manner are added by the addition unit 33G, and the thrust estimation value of the electromagnetic actuators 7 and 10 is calculated.

Hereinafter, the embodiment is summarized as below. As illustrated in FIG. 1, the electromagnetic actuators 7 and 10 are provided between the vehicle body 2 and the wheels 3 and 4 of the vehicle 1. As illustrated in FIG. 2, the electromagnetic actuators 7 and 10 include the permanent magnets 13 and the armature 14, and generate an adjustable force between the vehicle body 2 and the wheels 3 and 4. As illustrated in FIGS. 1 to 5, the controller 31 serving as a control device (vehicle behavior control device) controls a force (generation force) generated by the electromagnetic actuators 7 and 10. The controller 31 includes a command value acquisition means, a relative displacement acquisition means, a movement direction command acquisition means, and an actual movement direction acquisition means.

The command value acquisition means detects or estimates a state where the vehicle body 2 behaves, and acquires a thrust command value that is a generation force command value of the electromagnetic actuators 7 and 10. The command value acquisition means corresponds to, for example, a processing of the thrust command calculation unit 32 of the controller 31. The relative displacement acquisition means acquires the relative displacement of the permanent magnets 13 and the armature 14. The relative displacement acquisition means corresponds to, for example, a processing of acquiring a displacement sensor value (detection value or estimated value) by the thrust command correction value calculation unit 33 of the controller 31. The movement direction command acquisition means acquires a movement direction command of the armature 14 with respect to the permanent magnet 13 from the thrust command value (generation force command value). The movement direction command acquisition means corresponds to a processing of acquiring a "command direction" that is a movement direction command from the thrust command value, for example, by the operating mode determination unit 33E of the thrust command correction value calculation unit 33. The actual movement direction acquisition means acquires an actual movement direction of the armature 14 with respect to the permanent magnet 13 from the relative displacement. The actual movement direction acquisition means corresponds to a processing of acquiring a "stroke direction" that is an actual movement direction from a relative speed (damper relative speed), for example, by the operating mode determination unit 33E of the thrust command correction value calculation unit 33.

Then, the controller 31 acquires the "thrust command correction value," which is a correction value, more specifically, the "speed-dependent thrust," based on the "command direction," which is the movement direction command, and the "stroke direction," which is the actual movement direction, and corrects the "thrust command value." In this case, the controller 31 acquires the current operating state of the electromagnetic actuators 7 and 10 from four operating modes (patterns) based on the command direction and the stroke direction, and corrects the thrust command value.

That is, the correction value is acquired according to the following four patterns (operating modes).

(1) Command direction (movement direction demand): Extension, Stroke direction (actual movement direction): Extension.

(2) Command direction (movement direction demand): Extension, Stroke direction (actual movement direction): Compression.

(3) Command direction (movement direction demand): Compression, Stroke direction (actual movement direction): Extension.

(4) Command direction (movement direction command): Compression, Stroke direction (actual movement direction): Compression.

In addition, in the embodiment, the speed-dependent thrust, which is the correction value, is acquired by the speed term unit 33F of the controller 31. In this case, the speed-dependent thrust is acquired by correcting (selecting) the gradient (speed coefficient) of the relative speed of the permanent magnet 13 and the armature 14 according to the operating mode, that is, the command direction and the stroke direction. In addition, in the embodiment, the cogging force map unit 33A of the controller 31 acquires a second correction value (thrust including cogging force) based on the cogging force generated between the permanent magnet 13 and the armature 14, and corrects the thrust command value using the second correction value. In addition, in the embodiment, the thrust command value is corrected using the "friction force" of the electromagnetic actuators 7 and 10 output from the friction force unit 33D of the controller 31.

Figure 6:
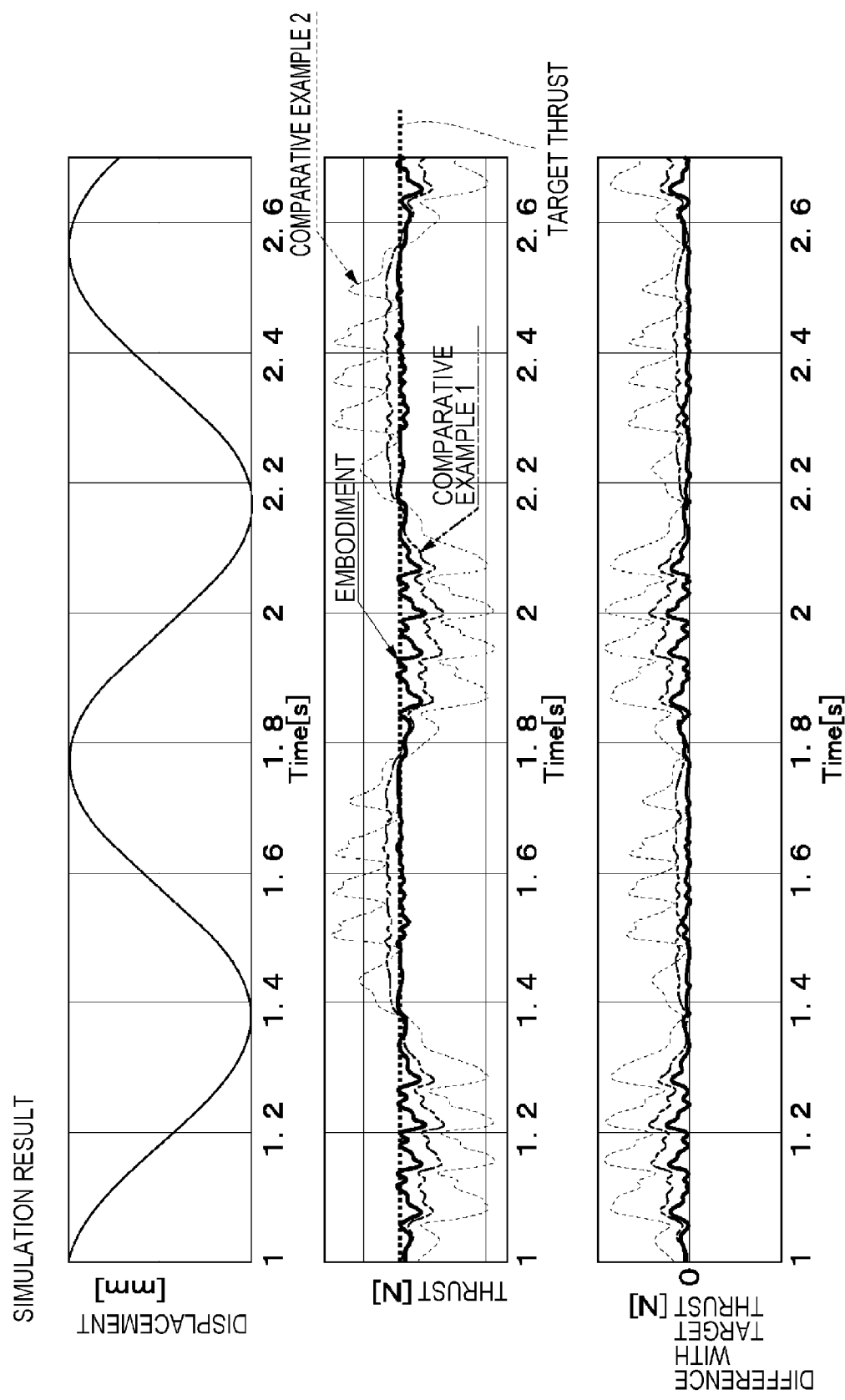
FIG. 6 is a characteristic diagram illustrating changes in "displacement," "thrust," and "a difference with a target thrust" over time of the electromagnetic actuator (force generating mechanism).

FIG. 6 illustrates changes in thrust (thrust pulsations) of the embodiment, Comparative Example 1 (Patent Document 1), and Comparative Example 2 (without control). In FIG. 6, the "embodiment" performs control in consideration of a thrust command direction, a thrust command amount, and a stroke direction. In FIG. 6, "Comparative Example 1" performs control according to Patent Document 1, and does not consider the thrust command direction, the thrust command amount, and the stroke direction. In FIG. 6, "Comparative Example 2" does not perform control. Comparative Example 1 (Patent Document 1) may reduce thrust pulsations compared to Comparative Example 2 (without control). With this regard, the embodiment may obtain the thrust which is closer to a target thrust even in a region where the stroke speed increases, compared to Comparative Example 1. That is, in the embodiment, by correcting the thrust command value according to the stroke direction and the thrust command value (command direction), the thrust pulsation of the electromagnetic actuators 7 and 10 may be reduced.

According to the embodiment described above, the controller 31 acquires a correction value (thrust command correction value) for the thrust command value (generation force command value) based on the command direction (movement direction command) and the stroke direction (actual movement direction), and corrects the thrust command value using the correction value. That is, the controller 31 corrects the thrust command value based on the stroke direction (actual movement direction), which is the actual direction in which the armature 14 moves with respect to the permanent magnet 13, and the command direction (movement direction command), which is the direction of a thrust command of the electromagnetic actuators 7 and 10. Thus, by this correction, a difference between the thrust command value acquired by the thrust command calculation unit 32 and the actually generated thrust (generation force) may be reduced. Accordingly, the pulsations of the electromagnetic actuators 7 and 10 may be suppressed. As a result, the ride comfort of the vehicle 1 may be improved.

According to the embodiment, the thrust command value (generation force command value) is corrected according to four patterns of the command direction (movement direction command) and the stroke direction (actual movement direction), that is, four operating modes. Therefore, based on a relationship (the pattern and operating mode) between the command direction and the stroke direction, the difference between the thrust command value acquired by the thrust command calculation unit 32 and the actually generated thrust (generation force) may be reduced. Accordingly, the pulsation of the electromagnetic actuators 7 and 10 may be suppressed. As a result, the ride comfort of the vehicle 1 may be improved.

According to the embodiment, the correction value (speed-dependent thrust) is acquired by correcting the gradient (speed coefficient) of the relative speed of the permanent magnet 13 and the armature 14 according to the command direction (movement direction command) and the stroke direction (actual movement direction). Thus, the correction value (speed-dependent thrust) may be adjusted according to the relative speed of the permanent magnet 13 and the armature 14. That is, the thrust command value may be corrected with a correction value which is adjusted according to the relative speed of the permanent magnet 13 and the armature 14. Accordingly, regardless of a change in the relative speed (whether the relative speed is fast or slow), the difference between the thrust command value acquired by the thrust command calculation unit 32 and the actually generated thrust (generation force) may be reduced. For example, the difference between the thrust command value dependent on the relative speed and the actually generated thrust (generation force) may be reduced. As a result, the pulsation of the electromagnetic actuators 7 and 10 may be suppressed in this respect as well, and the ride comfort of the vehicle 1 may be improved.

According to the embodiment, the second correction value (thrust including cogging force) is acquired based on the cogging force generated between the permanent magnet 13 and the armature 14, and the thrust command value is corrected using the second correction value. Therefore, the difference between the thrust command value based on the cogging force and the actually generated thrust (generation force) may be reduced.

According to the embodiment, the thrust command value is corrected using the friction force of the electromagnetic actuators 7 and 10. Therefore, the difference between the thrust command value based on the friction force and the actually generated thrust (generation force) may be reduced.

In the embodiment, it is exemplified that the electromagnetic actuators 7 and 10 are installed on all of four wheels of the vehicle 1. However, the present disclosure is not limited thereto, and for example, may be configured to install the electromagnetic actuator only on the two front wheels (left and right front wheels 3) of the four wheels of the vehicle, or only on the two rear wheels (left and right rear wheels 4) of the four wheels of the vehicle.

In the embodiment, it is exemplified that the electromagnetic actuators 7 and 10 are installed on the four-wheeled vehicle 1. However, the present disclosure is not limited thereto, and for example, may be configured to install the electromagnetic actuator (force generating mechanism) on a vehicle with four or more wheels, such as six wheels. In addition, the present disclosure may be configured to install the electromagnetic actuators 7 and 10 on a two-wheeled vehicle.

In the embodiment, it is exemplified that the electromagnetic actuators 7 and 10 are configured by the armature 14 installed on the stator 11 and the permanent magnet 13 installed on the mover 12. However, the present disclosure is not limited thereto, and the electromagnetic actuator (force generating mechanism) may be configured by, for example, a permanent magnet installed on a stator and an armature installed on a mover.

In the embodiment, it is exemplified that the electromagnetic actuators 7 and 10 are configured by a linear motor (linear movement motor). However, the present disclosure is not limited thereto, and the electromagnetic actuator (force generating mechanism) may be configured by, for example, a rotary motor. In this case, the electromagnetic actuator (force generating mechanism) may be configured to include a rotary motor and a rotary linear movement conversion mechanism (e.g., a ball screw mechanism, a ball nut mechanism, and a rack and pinion mechanism). When the power generating mechanism is configured by a rotary motor, the direction (movement direction command and actual movement direction) of movement of the armature with respect to the permanent magnet may utilize a rotation direction (rotation direction command and actual rotation direction).

In the embodiment, it is exemplified that the stator 11 is attached to the spring upper member (e.g., the vehicle body side) of the vehicle 1 and the mover 12 is attached to the spring lower member (e.g., the wheel side of the vehicle 1). However, the present disclosure is not limited thereto, and for example, the stator may be attached to the spring lower member of the vehicle and the mover may be attached to the spring upper member of the vehicle.

In the embodiment, it is exemplified that the electromagnetic actuators 7 and 10 are disposed in a vertical arrangement and attached to the vehicle 1 of the automobile. However, the present disclosure is not limited thereto, and for example, the vehicle may be other than an automobile, such as a railway vehicle, and the electromagnetic actuator may be attached to the vehicle in a horizontal arrangement.

In the embodiment, it is exemplified that a linear motor having a circular cross-sectional shape is configured, for example, the stator 11 and the mover 12 are formed in a cylindrical shape. However, the present disclosure is not limited thereto, and for example, a linear motor having an I-shape (flat), a rectangular shape, or an H-shape in a cross-section, or a linear motor having a cylindrical shape other than a circular shape in the cross-section may be configured.

In the embodiment, as a vehicle state detection means, a front-rear acceleration sensor, a lateral acceleration sensor, a wheel speed sensor, a steering angle sensor, a yaw rate sensor, a vehicle speed sensor, a vehicle-height sensor, a spring upper vertical acceleration sensor, a spring upper vertical speed sensor, a spring lower vertical acceleration sensor, and a spring lower vertical speed sensor are exemplified. However, the present disclosure is not limited thereto, and for example, as for the vehicle state detection means, sensors other than the sensors exemplified, such as a stroke sensor, a displacement sensor, a preview sensor (external recognition sensor) may be used. As for the preview sensor (external recognition sensor), a camera (e.g., a digital camera) such as a stereo-camera or a single camera, and/or a radar (e.g., a light-emitting element that emits light such as a semiconductor laser and a light-receiving element that receives the light), LiDAR, or SONAR may be used.

In the embodiment, it is exemplified that the electromagnetic actuators 7 and 10 are mounted on the vehicle 1. However, the present disclosure is not limited thereto, and, for example, the electromagnetic actuator may be mounted on various devices (a mechanical device and an electrical device) other than the vehicle. That is, the electromagnetic actuator may be installed in a portion between the first member and the second member, where it is necessary to generate an adjustable force. In other words, the electromagnetic actuator may be installed not only between the vehicle body and the wheels of the vehicle, but also between a first member and a second member of various devices (the mechanical device and the electrical device) including the vehicle. For example, the electromagnetic actuator may be installed between a target vibration-suppression member (first member) such as a plate (vibration isolation) and a washing machine and the floor (second member). The control device that controls the generation force (thrust) of the electromagnetic actuator is not limited to a vehicle control device (vehicle behavior control device), and may be widely applied as a control device that controls the generation force (thrust) of the electromagnetic actuator installed between the first member and the second member of various devices. In other words, a force generating mechanism system including an electromagnetic actuator (force generating mechanism) and a control device may be widely applied not only as a force generating mechanism system (electromagnetic actuator system) for a vehicle, but also as a force generating mechanism system (electromagnetic actuator system) for various devices other than vehicle.

According to the embodiment described above, the correction value for the generation force command value is acquired based on the movement direction command and the actual movement direction, and the generation force command value is corrected using the correction value. That is, the generation force command value is corrected based on the actual direction (actual movement direction) in which the armature moves with respect to the permanent magnet, and the command direction (movement direction command). Thus, by the correction, the difference between the generation force command value acquired by the command value acquisition means and the actual generation force may be reduced. Accordingly, the pulsation of the force generating mechanism may be suppressed. In addition, when the force generating mechanism is installed between the vehicle body and the wheels of the vehicle, the ride comfort of the vehicle may be improved.

According to the embodiment, the generation force command value is corrected according to four patterns of the movement direction command and the actual movement direction, for example, four operating modes. Therefore, based on the relationship (the pattern and operating mode) between the movement direction command and the actual movement direction, the difference between the generation force command value acquired by the command value acquisition means and the actual generation force may be reduced. As a result, the pulsation of the force generating mechanism may be suppressed. In addition, when the force generating mechanism is installed between the vehicle body and the wheel of the vehicle, the ride comfort of the vehicle may be improved.

According to the embodiment, the correction value is acquired by correcting the gradient of the relative speed of the permanent magnet and the armature according to the movement direction command and the actual movement direction. Therefore, the correction value may be adjusted according to the relative speed of the permanent magnet and the armature. That is, the generation force command value may be corrected by the correction value adjusted according to the relative speed of the permanent magnet and the armature. Accordingly, regardless of a change in relative speed (whether the relative speed is fast or slow), the difference between the generation force command value acquired from the command value acquisition means and the actual generation force may be reduced. In other words, the difference between the generation force command value that depends on the relative speed and the actual generation force may be reduced. As a result, the pulsation of the force generating mechanism may be suppressed in this aspect as well (the ride comfort of the vehicle may be improved).

According to the embodiment, the second correction value based on the cogging force generated between the permanent magnet and the armature is acquired, and the generation force command value is also corrected by using the second correction value. Therefore, the difference between the generation force command value based on the cogging force and the actual generation force may also be reduced.

According to the embodiment, the generation force command value is also corrected by using the friction force of the force generating mechanism. Therefore, the difference between the generation force command value based on the friction force and the actual generation force may be reduced.

DESCRIPTION OF SYMBOLS

1: Vehicle
2: Vehicle body (First member)
3: Front wheel (Wheel, Second member)
4: Rear wheel (Wheel, Second member)
7, 10: Electromagnetic actuator (Force generating mechanism)
31: Controller (Control device, Vehicle Behavior Control Device)

What is claimed is:

1. A control device for controlling a generation force of a force generating mechanism including a permanent magnet and an armature that generate an adjustable force between a first member and a second member, the control device comprising:
   a command value acquisition circuitry configured to acquire a generation force command value of the force generating mechanism by detecting or estimating a state where the first member behaves;
   a relative displacement acquisition circuitry configured to acquire a relative displacement of the permanent magnet and the armature;
   a movement direction command acquisition circuitry configured to acquire a movement direction command of the armature with respect to the permanent magnet from the generation force command value; and
   an actual movement direction acquisition circuitry configured to acquire an actual movement direction of the armature with respect to the permanent magnet from the relative displacement,
   wherein the generation force command value is corrected by acquiring a correction value through correcting a gradient of a relative speed of the permanent magnet and the armature, based on the movement direction command and the actual movement direction.

2. A vehicle behavior control device for controlling a generation force of a force generating mechanism installed between a vehicle body and a wheel of a vehicle and including a permanent magnet and an armature that generate an adjustable force between the vehicle body and the wheel, the vehicle behavior control device comprising:
   a command value acquisition circuitry configured to acquire a generation force command value of the force generating mechanism by detecting or estimating a state where the vehicle behaves;
   a relative displacement acquisition circuitry configured to acquire a relative displacement of the permanent magnet and the armature;
   a movement direction command acquisition circuitry configured to acquire a movement direction command of the armature with respect to the permanent magnet from the generation force command value; and
   an actual movement direction acquisition circuitry configured to acquire an actual movement direction of the armature with respect to the permanent magnet from the relative displacement,
   wherein the generation force command value is corrected by acquiring a correction value, based on the movement direction command and the actual movement direction.

3. The control device according to claim 1, wherein the correction value is acquired according to following four patterns:
   1) movement direction command: extension, actual movement direction: extension,
   2) movement direction command: extension, actual movement direction: compression,
   3) movement direction command: compression, actual movement direction: extension, and 4) movement direction command: compression, actual movement direction: compression.

4. The control device according to claim 1, wherein a second correction value is acquired based on a cogging force generated between the permanent magnet and the armature, and
   the generation force command value is corrected by using the second correction value.

5. The control device according to claim 1, wherein the generation force command value is corrected by using a frictional force of the force generating mechanism.

6. A force generating mechanism system comprising: a force generating mechanism installed between a vehicle body and a wheel of a vehicle and including a permanent magnet and an armature that generate an adjustable force between the vehicle body and the wheel; and
   a control device configured to control a generation force of the force generating mechanism,
   wherein the control device includes:
   a command value acquisition circuitry configured to acquire a generation force command value of the force generating mechanism by detecting or estimating a state where the vehicle behaves;
   a relative displacement acquisition circuitry configured to acquire a relative displacement of the permanent magnet and the armature;
   a movement direction command acquisition circuitry configured to acquire a movement direction command of the armature with respect to the permanent magnet from the generation force command value; and
   an actual movement direction acquisition circuitry configured to acquire an actual movement direction of the armature with respect to the permanent magnet from the relative displacement,
   wherein the generation force command value is corrected by acquiring a current operating state from four operating modes based on the movement direction command and the actual movement direction.

* * * * *

UNITED STATES PATENT AND TRADEMARK OFFICE
CERTIFICATE OF CORRECTION

| | | |
|---|---|---|
| PATENT NO. | : 12,489,384 B2 | Page 1 of 1 |
| APPLICATION NO. | : 18/844847 | |
| DATED | : December 2, 2025 | |
| INVENTOR(S) | : Yuki Shinotsuka, Yasuaki Aoyama and Ryosuke Hoshi | |

It is certified that error appears in the above-identified patent and that said Letters Patent is hereby corrected as shown below:

On the Title Page

Item (73) Assignee: HITACHI ASTEMO, LTD.
Should be: ASTEMO, LTD.

Signed and Sealed this
Tenth Day of February, 2026

John A. Squires
*Director of the United States Patent and Trademark Office*